United States Patent
Kempf et al.

(10) Patent No.: US 8,762,501 B2
(45) Date of Patent: Jun. 24, 2014

(54) IMPLEMENTING A 3G PACKET CORE IN A CLOUD COMPUTER WITH OPENFLOW DATA AND CONTROL PLANES

(75) Inventors: James Kempf, Mountain View, CA (US); Neda Beheshti-Zavareh, San Jose, CA (US); Ying Zhang, San Jose, CA (US); Tord K. Nilsson, Bohus-Björkö (SE); Bengt E. Johansson, Västra Frölunda (SE); Sten Rune Pettersson, Torslanda (SE); Harald Luning, Gothenburg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/220,471

(22) Filed: Aug. 29, 2011

(65) Prior Publication Data

US 2013/0054761 A1    Feb. 28, 2013

(51) Int. Cl.
*G06F 15/177* (2006.01)
*G06F 15/173* (2006.01)
*H04W 40/00* (2009.01)

(52) U.S. Cl.
USPC ............ 709/220; 709/221; 709/223; 709/228

(58) Field of Classification Search
USPC ......................................... 709/220–226, 228
See application file for complete search history.

(56) References Cited

U.S. PATENT DOCUMENTS

| 7,937,438 | B1 * | 5/2011 | Miller et al. | 709/203 |
|---|---|---|---|---|
| 7,953,865 | B1 * | 5/2011 | Miller et al. | 709/227 |
| 7,991,859 | B1 * | 8/2011 | Miller et al. | 709/220 |
| 2002/0006114 | A1 * | 1/2002 | Bjelland et al. | 370/248 |
| 2003/0030662 | A1 * | 2/2003 | Poisson et al. | 345/735 |
| 2003/0043786 | A1 * | 3/2003 | Kall et al. | 370/352 |
| 2003/0126435 | A1 * | 7/2003 | Mizell et al. | 713/168 |
| 2005/0018637 | A1 * | 1/2005 | Karoubalis et al. | 370/338 |
| 2005/0059398 | A1 * | 3/2005 | Jaupitre et al. | 455/435.2 |
| 2005/0270992 | A1 * | 12/2005 | Sanzgiri et al. | 370/310.2 |
| 2009/0138577 | A1 * | 5/2009 | Casado et al. | 709/220 |

(Continued)

FOREIGN PATENT DOCUMENTS

WO    WO-2010099513    9/2010

OTHER PUBLICATIONS

Heller, Brandon, OpenFlow Switch Specification Version 0.8.9, Dec. 2, 2008.*

(Continued)

*Primary Examiner* — Brian J Gillis
*Assistant Examiner* — Michael A Keller
(74) *Attorney, Agent, or Firm* — Blakely, Sokoloff, Taylor & Zafman LLP

(57) ABSTRACT

A method for implementing a general packet radio service (GPRS) tunnel protocol (GTP) in a packet core (PC) of a third generation (3G) network having a split architecture where a control plane of the PC of the 3G network is in a cloud computing system, the cloud computing system including a controller, the controller to execute a plurality of control plane modules, the control plane to communicate with the data plane of the PC through a control plane protocol, the data plane implemented in a plurality of network elements of the 3G network by configuring switches implementing a data plane of the SGSN and GGSN and intermediate switches to establish a first and second GTP tunnel endpoint.

14 Claims, 20 Drawing Sheets

(56) References Cited

U.S. PATENT DOCUMENTS

| | | | |
|---|---|---|---|
| 2009/0175215 A1* | 7/2009 | Chen et al. | 370/328 |
| 2009/0213784 A1* | 8/2009 | Ang | 370/328 |
| 2010/0135255 A1* | 6/2010 | Zhang et al. | 370/331 |
| 2010/0220622 A1 | 9/2010 | Wei | |
| 2010/0257263 A1* | 10/2010 | Casado et al. | 709/223 |
| 2011/0004913 A1* | 1/2011 | Nagarajan et al. | 726/1 |
| 2011/0082941 A1* | 4/2011 | Kim et al. | 709/227 |
| 2011/0225282 A1* | 9/2011 | Hahm et al. | 709/223 |
| 2011/0231545 A1* | 9/2011 | Enomoto et al. | 709/224 |
| 2011/0289134 A1 | 11/2011 | de los Reyes et al. | |
| 2011/0299537 A1* | 12/2011 | Saraiya et al. | 370/392 |
| 2011/0317559 A1* | 12/2011 | Kern et al. | 370/235 |
| 2012/0221700 A1 | 8/2012 | Dutta et al. | |

OTHER PUBLICATIONS

McKeown (McKeown, Nick, OpenFlow: Enabling Innovation in Campus Networks, Apr. 2008, ACM SIGCOMM Computer Communication Review, vol. 38, No. 2).*

Open Flow 1 1: http://openflow.org/documents/openflow_1.1-almerged-draft2.pdf; Oct. 23, 2010, 67 pages.

General Packet Radio Service (GPRS) enhancements for Evolved Universal Terrestrial Radio Access Network (E-UTRAN access) Release 9; ETSI TS 123401.v. 92.0; Oct. 2009, 247 pages.

Black, et al; Per Hop Behavior Identification Codes; http://www.rfc-editor.orq/rfc/rfc3140.txt; Jul. 28, 2011; 8 pages.

IEEE Standard for Local and metropolitan area networks; Media Access Control (MAC) Bridges; IEEE Std 802.1D; Jun. 9, 2004; 281 pages.

3GPP TS 23.228; 3rd Generation Partnership Project; Technical Specification Group Services and System Aspects; IP Multimedia Subsystem; Stage 2; Jun. 2004; 178 pages.

EKSTROM; "QoS Control in the 3GPP Evolved Packet System", IEEE Communications Magazine. pp. 76-83, Feb. 2009.

3GPP TS 29.281, "General Packet Radio System (GPRS) Tunneling Protocol User Plane (GTPv1-U)" Release 9; Jun. 2010, 26 pages.

Wood, T.; et al., "The Case for Enterprise Ready Virtual Private Clouds," Usenix HotCloud 09, http://www.usenix.org/event/hotcloud09/tech/full_papers/wood.pdf, 5 pages.

Openflow Switch Specification; Version 0.8.9; http://www.openflowswitch.org/wk/index.php/Config_Protocol_Draft_Proposal; Dec. 2 2008, 33 pages.

Menezes, A., et al. "handbook of Applied Cryptography," CRC Press, Boca Raton, 1997;Chapter 9, pp. 321-383.

Non-Final Office Action for U.S. Appl. No. 13/113,727 mailed Apr. 24, 2013, 19 pages.

"Architecture Enhancements for Non-3GPP Accesses", ETSI TS 123 402 V10.3.0, (Mar. 2011), 1-228.

3GPP TS 23.402, "3rd Generation Partnership Project; Technical Specification Group Services and System Aspects; Architecture enhancements for non-3GPP accesses (Release 10)," Mar. 2011, 227 pages, V10.3.0 3GPP.

Non-Final Office Action, U.S. Appl. No. 13/536,838, dated Dec. 31, 2013, 28 pages.

Non-Final Office Action, U.S. Appl. No. 13/113,727, dated Dec. 31, 2013, 20 pages.

Non-Final Office Action for U.S. Appl. No. 13/113,727, mailed Apr. 24, 2013, 19 pages.

"OpenFlow MPLS Implementation", OpenFlow Wiki, (Aug. 2010), pp. 1-11.

Gouveia, Fabricio, et al., "Cloud Computing and EPC/IMS Integration: New Value-Added Services on Demand", (Sep. 2009), pp. 1-5.

Hideyuki, Shimonishi, et al., "Virtualized Network Infrastructure using OpenFlow", System Platforms Research Laboratories, NEC Corporation, (2010), pp. 74-79.

"IP Multimedia Sybsystem (IMS); Stage 2", 3GPP, TS, 23.228, Release 9, 2010, 254 pages.

"Evolved General Packet RAdio Service (GPRS) Tunneling Protocol for Control Plane (GTPv2-C)", 3GPP TS 29.274, 2010.

"Universal Mobile Telecommunications System (UMTS); LTE; Network sharing: Architecutre and functional description (3GPP TS 23.251 version 10.1.0 Release 10", Technical Specification European Telecommunications Standards Institute (ETSI) 650, Route Des Lucioles; F-06921 Sophia-Antipolis, France vol. 3GPP SA 2t No. V10.1.0, Mar. 1, 2011.

Baliga, et al., "VPMN—Virtual Private Mobile Network Towards Mobility-as-a-Service", MCS '11, Jun. 28, 2011.

Kempf, J., et al., "Openflow MPLS and the Open Source Label Switched Router", Proceedings of the International Teletraffic Conference, IEEE, Sep. 2011.

Nurmi, Daniel, et al., "The Eucalyptus Open-source Cloud-computing System", Proceedings of Cloud Computing and Applications, 2008.

Final Office Action for U.S. Appl. No. 13/113,727, mailed Oct. 21, 2013, 19 pages.

"OpenFlow Switch Specification version", Dec. 5, 2011; XP055073743; URL:https://www.opennetworking.org/images/stories/downloads/sdn-rescources/onf-specifications/openflow/openflow-spec-v1.2.pdf; 82 pages.

Baliga, Arati, et al., "VPMN—Virtual Private Mobile Network Towards Mobility-as-a-Service", Jun. 28, 2011; pp. 7-11; XP055035013; Bethesda MD; p. 7 last paragraph p. 9 last paragraph.

Shimonishi, Hideyuki, et al., "Virtualized network infrastructure using OpenFlow", Network Operations and Management Symposium Workshops (NOMS WKSPS); Apr. 18, 2010; pp. 74-79.

* cited by examiner

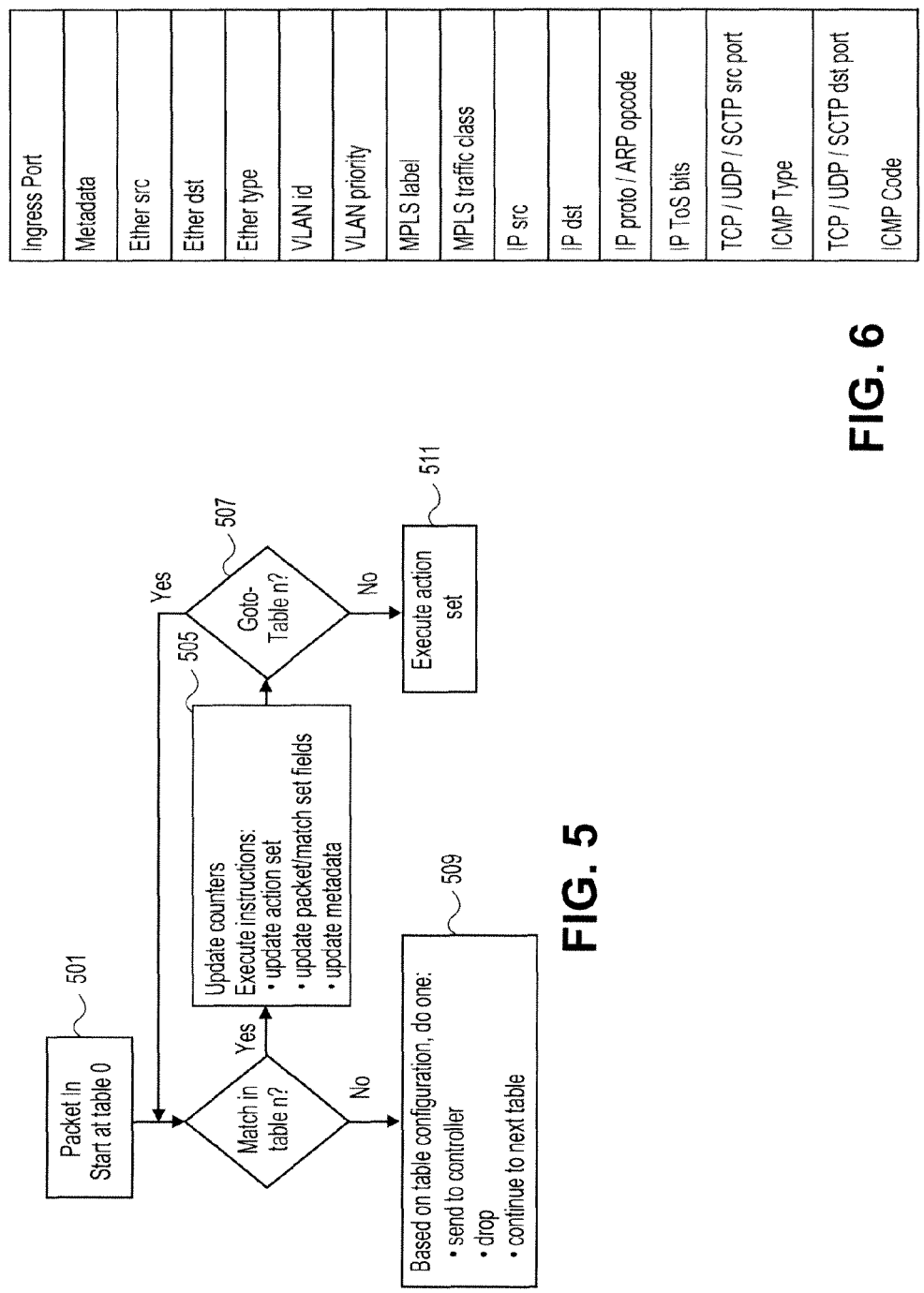

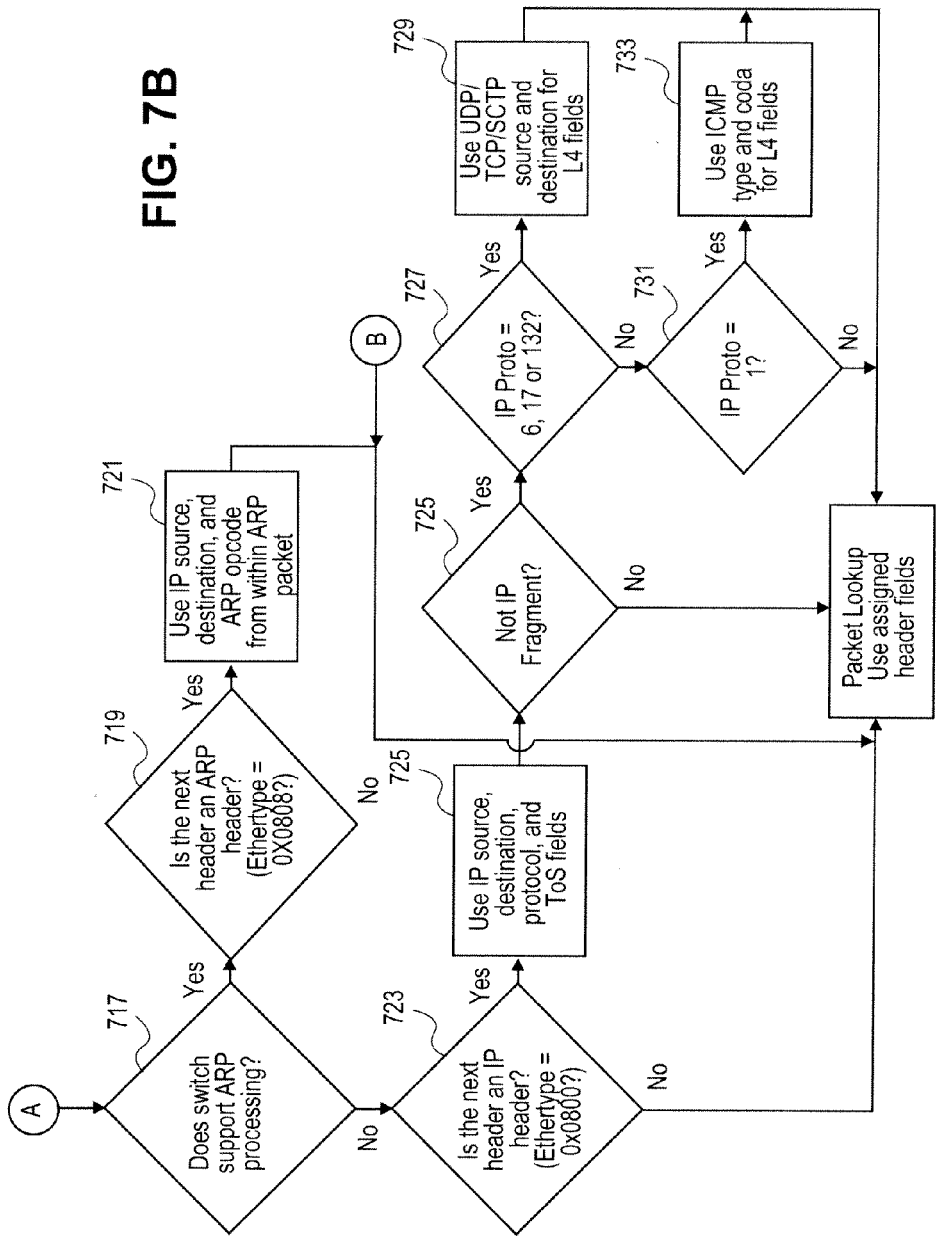

| Octets | Bits | | | | | | | |
|---|---|---|---|---|---|---|---|---|
| | 8 | 7 | 6 | 5 | 4 | 3 | 2 | 1 |
| 1 | Version | | | PT | (*) | E | S | PN |
| 2 | Message Type | | | | | | | |
| 3 | Length (1st Octet) | | | | | | | |
| 4 | Length (2nd Octet) | | | | | | | |
| 5 | Tunnel Endpoint Identifier (1st Octet) | | | | | | | |
| 6 | Tunnel Endpoint Identifier (2nd Octet) | | | | | | | |
| 7 | Tunnel Endpoint Identifier (3rd Octet) | | | | | | | |
| 8 | Tunnel Endpoint Identifier (4th Octet) | | | | | | | |
| 9 | Sequence Number (1st Octet) | | | | | | | |
| 10 | Sequence Number (2nd Octet) | | | | | | | |
| 11 | N-PDU Number | | | | | | | |
| 12 | Next Extension Header Type | | | | | | | |

NOTE 0: (*) This bit is a spare bit. It shall be sent as '0'. The receiver shl not evaluate this bit.
NOTE 1: 1) This field shall only be evaluated when indicated by the S flag set to 1.
NOTE 2: 2) This field shall only be evaluated when indicated by the PN flag set to 1.
NOTE 3: 3) This field shall only be evaluated when indicated by the E flag set to 1.
NOTE 4: 4) This field shall be present if and only if any one or more of the S, PN and E flags are set.

FIG. 9

| |
|---|
| Ingress Port |
| Metadata |
| Ether src |
| Ether dst |
| Ether type |
| VLAN id |
| VLAN priority |
| MPLS label |
| MPLS traffic class |
| IP src |
| IP dst |
| IP proto / ARP opcode |
| IP ToS bits |
| TCP / UDP / SCTP src port<br>ICMP Type |
| TCP / UDP / SCTP dst port<br>ICMP Code |
| 2 byte GTP header flags field |
| 4 byte GTP TEID |

FIG. 16

| TEID | VLAN tags (if any) | MPLS labels (if any) | Tunnel Origin Src IP Address | Tunnel End Dest IP Address | QoS DSCP Marking (if any) |
|---|---|---|---|---|---|
| 16 bits | variable | variable | 32 bits | 32 bits | 6 bits |

FIG. 17

IMPLEMENTING A 3G PACKET CORE IN A CLOUD COMPUTER WITH OPENFLOW DATA AND CONTROL PLANES

FIELD OF THE INVENTION

The embodiments of the invention relate to a method and system for implementing a control plane of a third generation packet core in a cloud computer system. Specifically, the embodiments of the invention relate to the use of the Open-Flow protocol to implement control of a data plane by the control plane being execute in a cloud computer system.

BACKGROUND

The general packet radios system (GPRS) is a system that is used for transmitting Internet Protocol packets between user devices such as cellular phones and the Internet. The GPRS system includes the GPRS core network, which is an integrated part of the global system for mobile communication (GSM). These systems are widely utilized by cellular phone network providers to enable cellular phone services over large areas.

The GPRS tunneling protocol (GTP) is an important communication protocol utilized within the GPRS core network. GTP enables end user devices (e.g., cellular phones) in a GSM network to move from place to place while continuing to connect to the Internet. The end user devices are connected to the Internet through a gateway GPRS support node (GGSN). The GGSN tracks the end user device's data from the end user device's serving GPRS support node (SGSN) that is handling the session originating from the end user device.

Three forms of GTP are used by the GPRS core network. GTP-U is used for transfer of user data in separated tunnels for each packet data protocol (PDP) context. GTP-C is used within the GPRS core network for signaling between GGSN and SGSN. GTP' is used for carrying charging data from Charging Data Function (CDP) of the GSM or UMTS network to the charging gateway function (CGF), which provides requisite end user device usage information to a billing system. GTP' uses the same message structure as GTP-C and GTP-U.

SUMMARY

A method for implementing a general packet radio service (GPRS) tunnel protocol (GTP) in a packet core (PC) of a third generation (3G) network having a split architecture where a control plane of the PC of the 3G network is in a cloud computing system, the cloud computing system including a controller, the controller to execute a plurality of control plane modules, the control plane to communicate with the data plane of the PC through a control plane protocol, the data plane implemented in a plurality of network elements of the 3G network, the method comprising the steps of: receiving a request by the controller to create a GTP tunnel in the PC of the 3G network between a serving GPRS support node (SGSN) and a gateway GPRS support node (GGSN) for a subscriber session; configuring a switch implementing a data plane of the SGSN, via the control protocol, to encapsulate and decapsulate packets of the subscriber session and to establish a first GTP tunnel endpoint; configuring at least one switch in a route of the GTP tunnel, via the control plane protocol, to forward packets of the subscriber session according to the GTP tunnel; and configuring a switch implementing a data plane of the GGSN, via the control plane protocol, to encapsulate and decapsulate the packets of the subscriber session and to establish a second GTP tunnel endpoint.

A cloud computing system for managing implementation of a general packet radio service (GPRS) tunnel protocol (GTP) in a packet core (PC) of a third generation (3G) network having a split architecture where a control plane of the PC of the 3G network is in the cloud computing system, the control plane to communicate with a data plane of the PC through a control plane protocol, the data plane implemented in a plurality of network elements of the 3G network, the cloud computing system comprising: a plurality of servers in communication with one another and in communication with the plurality of network elements implementing the data plane of the PC, the plurality of servers executing, a controller configured to execute a plurality of control plane modules implementing the control plane of the PC, each control plane module to provide a set of control plane functions for managing the data plane, the controller configured to receive a request to create a GTP tunnel in the PC of the 3G network between a serving GPRS support node (SGSN) and a gateway GPRS support node (GGSN) for a subscriber session, the controller configured to configure a switch implementing a data plane of the SGSN, via the control plane protocol, to encapsulate and decapsulate packets of the subscriber session and to establish a first GTP tunnel endpoint, the controller configured to configure at least one switch in a route of the GTP tunnel, via the control plane protocol, to forward packets of the subscriber session according to the GTP tunnel, and the controller configured to configure a switch implementing a data plane of the GGSN, via the control plane protocol, to encapsulate and decapsulate the packets of the subscriber session and to establish a second GTP tunnel endpoint; and a cloud manager communicatively coupled to the controller, the cloud manager configured to manage execution of the plurality of control plane modules of the PC.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 5 is a flowchart of one embodiment of the OpenFlow rule matching process.

FIG. 6 is a diagram of the fields, which a matching process can utilize for identifying rules to apply to a packet.

FIGS. 7A and 7B are a flowchart of one embodiment of a process for OpenFlow header processing.

FIG. 9 is a diagram of one embodiment of the header fields in the primary GTP-U encapsulation header.

FIG. 16 is a diagram of one embodiment of the OpenFlow flow table modification for GTP TEID routing.

FIG. 17 is a diagram of the structure of a flow table row.

DETAILED DESCRIPTION

Figure 1:
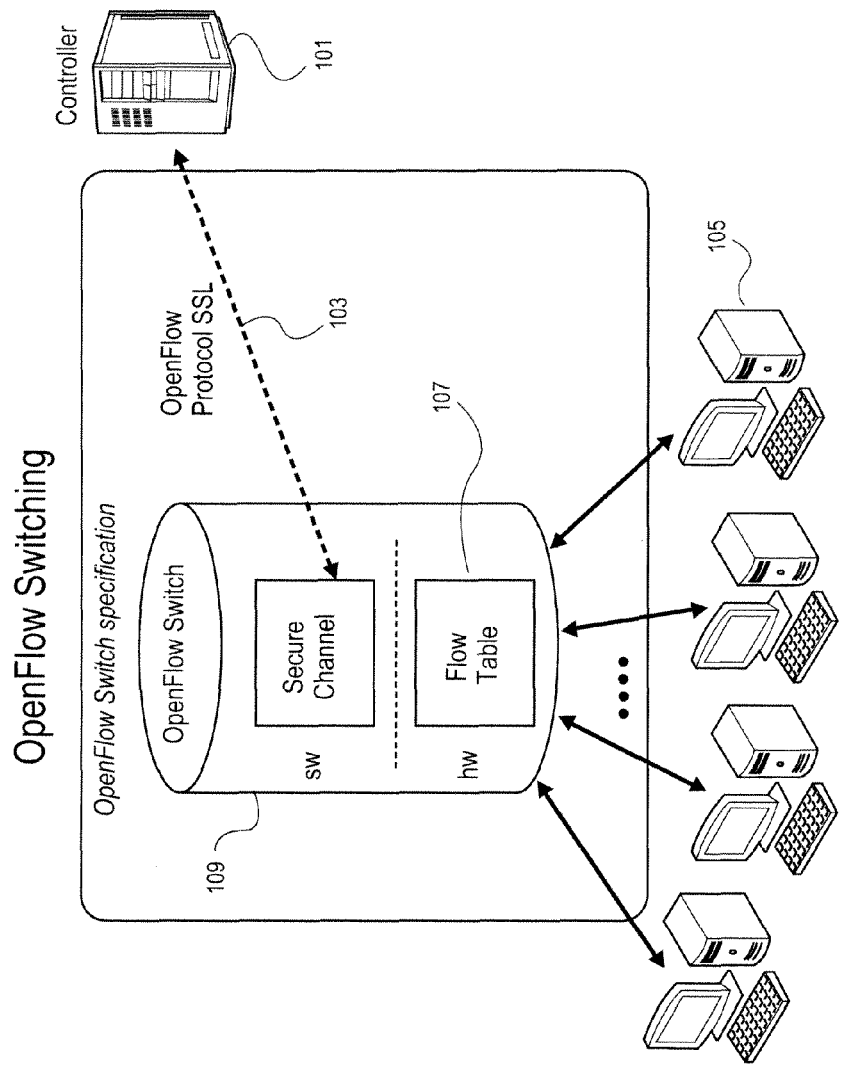
FIG. 1 is a diagram of one embodiment of an example network with an OpenFlow switch.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiments of FIGS. 8, 10-12, 14, and 15. However, it should be understood that the operations of the flow diagrams can be performed by embodiments of the invention other than those discussed with reference to FIGS. 8, 10-12, 14, and 15, and the embodiments discussed with reference to FIGS. 8, 10-12, 14, and 15 can perform operations different than those discussed with reference to the flow diagrams of FIGS. 5, 7, 13, 18, 19, 20 and 21.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly)) to edge network elements, which are coupled (e.g., through one or more core network elements to other edge network elements) to other end stations (e.g., server end stations).

The embodiments of the present invention provide a method and system for avoiding the disadvantages of the prior art. The disadvantages of the prior art are that prior implementations of the 3G packet core use a pool of servers that are dedicated to a specific network entity, such as a server pool that is dedicated to hosting a SGSN. When additional signaling demands require that extra capacity, then a new SGSN instance is instantiated in the server pool. However, when demand is high for the services of the home subscriber server (HSS), the server pool dedicated to the HSS servers will be heavily utilized, but the server pool for the SGSN is underutilized. These underutilized server pools continue to require maintenance and incur operating expenses, but are not providing optimum performance for the network operator.

In some situations, managed services companies build and run mobile operator networks, while the mobile operator itself handles marketing, billing, and customer relations. The signaling and data traffic for each mobile operator network is kept private and isolated from the traffic of their competitors, even though their network and their competitors' networks may be managed by the same managed services company. The managed services company must maintain a completely separate server pool and physical signaling network for each mobile operator it supports. As a result, there is a large duplication of resources and an underutilization of server capacity.

This increases operating expenses for the managed services companies and the mobile operator network due to the additional equipment, power and cooling requirements.

The 3G packet core architecture as it is currently defined allows only one point of presence (PoP) between the mobile operator's fixed core/Internet and the mobile aggregation network, that is, there is a single gateway GPRS support node (GGSN). Mobile network operators cannot set up multiple peering points and PoPs between neighboring operators within the aggregation network. This would reduce the amount of traffic that flows into the mobile operator's core network, thereby reducing the need for expensive and time consuming core network upgrades. In addition, peering points are usually without cost to operators as long as the service level agreements (SLA)s are observed. However, this flexibility of deployment is unavailable to mobile operators due to the need to anchor their PoP with the core/Internet at a single mobile gateway.

The 3G PC architecture also contains little flexibility for specialized treatment of user flows. Though the architecture does provide support for establishing quality of service (QoS), other sorts of data management are not available. For example services involving middleboxes, such as specialized deep packet inspection or interaction with local data caching and processing resources that might be utilized for transcoding or augmented reality applications is difficult to support with the current 3G PC architecture. Almost all such applications require the packet flows to exit through the GGSN, thereby being de-tunneled from GTP, and to be processed within the wired network.

Implementing the control plane of an 3G PC in a cloud computing facility and the data plane of the 3G PC using a set of OpenFlow switches, as well as managing communication between the control plane and the dataplane using the OpenFlow protocol (e.g., OpenFlow 1.1), creates a problem that the OpenFlow protocol does not support GTP or GTP tunnel endpoint identifier (TEID) routing, which is necessary for implementing the data plane of the 3G PC The embodiments of the invention overcome these disadvantages of the prior art. The disadvantages of the prior art are avoided by splitting the control plane and the data plane for the 3G PC architecture and to implement the control plane by deploying the 3G PC control plane entities in a cloud computing facility, while the data plane is implemented by a distributed collection of OpenFlow switches. The OpenFlow protocol is used to connect the two, with enhancements to support GTP routing. While the 3G PC architecture already has a split between the control plane and the data plane, in the sense that the SSGN and the GGSN are primarily data plane entities while the home location register (HLR), home subscriber server (HSS) and authentication center (AUC) are primarily control plane entities, this split was made at the level of the mobility management protocol, GTP.

The standard 3G PC architecture assumes a standard routed IP network for transport on top of which the mobile network entities and protocols are implemented. The enhanced 3G PC architecture described herein is instead at the level of IP routing and media access control (MAC) switching. Instead of using L2 routing and L3 internal gateway protocols to distribute IP routing and managing Ethernet and IP routing as a collection of distributed control entities, L2 and L3 routing management is centralized in a cloud facility and the routing is controlled from the cloud facility using the OpenFlow protocol. As used herein, the "OpenFlow protocol" refers to the OpenFlow network protocol and switching specification defined in the OpenFlow Switch Specification at www.openflowswitch.org a web site hosted by Stanford University. As used herein, an "OpenFlow switch" refers to a network element implementing the OpenFlow protocol.

The standard 3G PC control plane entities HSS, HLR, AUC, visitor location register (VLR), equipment identity register (EIR), sort message service interworking message center (SMS-IWMSC), SMS gateway message center (SMS-GMSC) and subscriber location function (SLF) and control plane aspects of the SGSN and GGSN are deployed in the cloud. The data plane consists of standard OpenFlow switches with enhancements as needed for routing GTP packets, rather than IP routers and Ethernet switches. At a minimum, the data plane parts of the SGSN and GGSN and the packet routing part of the NodeB in the E-UTRAN require OpenFlow enhancements for GTP routing. Additional enhancements for GTP routing may be needed on other switches within the 3G PC architecture depending on how much fine grained control over the routing an operator requires. The enhancements for GTP routing include processes for establishing GTP tunnels, modifying GTP tunnels and tearing down GTP tunnels within the 3G PC architecture.

The split between the control and data plane parts of the 3G PC can be used together with virtual private cloud (VPC) technology to implement multiple PoPs within a single 3G PC, provide GTP flow-specific routing for specialized applications, and run multiple operator networks from a single cloud computing facility.

In one embodiment, the cloud based 3G PC system can be implemented as a set of hardware devices. In another embodiment, the system components are implemented in software (for example microcode, assembly language or higher level languages). These software implementations can be stored on a non-transitory computer-readable medium. A non-transitory "computer-readable" medium can include any medium that can store information. Examples of the non-transitory computer-readable medium include a read only memory (ROM), a floppy diskette, a CD Rom, a DVD, a flash memory, a hard drive, an optical disc or similar medium.

OpenFlow 1.0 Networks

FIG. 1 is a diagram of one embodiment of an example network with an OpenFlow switch, conforming to the OpenFlow 1.0 specification. The OpenFlow 1.0 protocol enables a controller 101 to connect to an OpenFlow 1.0 enabled switch 109 using a secure channel 103 and control a single forwarding table 107 in the switch 109. The controller 101 is an external software component executed by a remote computing device that enables a user to configure the OpenFlow 1.0 switch 109. The secure channel 103 can be provided by any type of network including a local area network (LAN) or a wide area network (WAN), such as the Internet.

Figure 2:
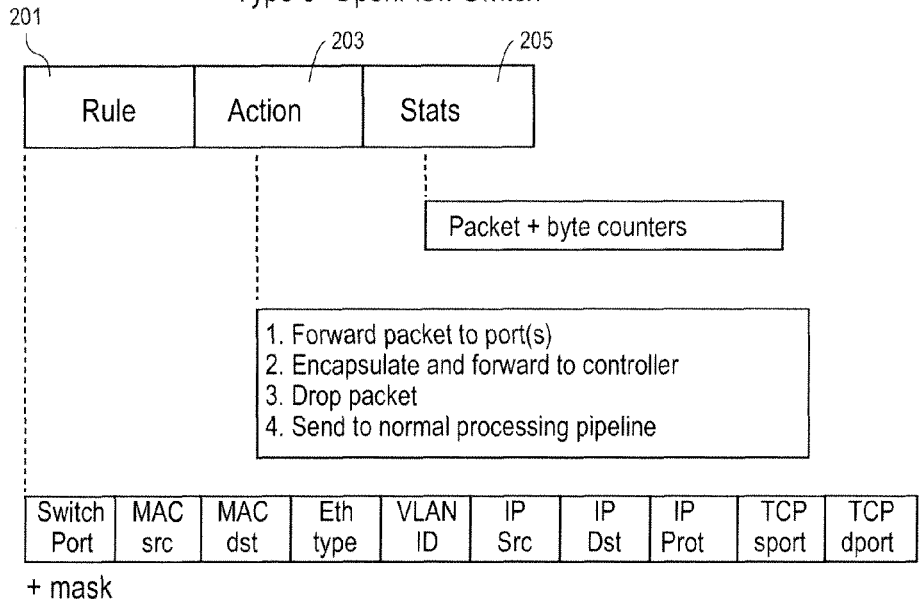
FIG. 2 is a diagram illustrating one embodiment of the contents of a flow table entry.

FIG. 2 is a diagram illustrating one embodiment of the contents of a flow table entry. The forwarding table 107 is populated with entries consisting of a rule 201 defining matches for fields in packet headers; an action 203 associated to the flow match; and a collection of statistics 205 on the flow. When an incoming packet is received a lookup for a matching rule is made in the flow table 107. If the incoming packet matches a particular rule, the associated action defined in that flow table entry is performed on the packet.

A rule 201 contains key fields from several headers in the protocol stack, for example source and destination Ethernet MAC addresses, source and destination IP addresses, IP protocol type number, incoming and outgoing TCP or UDP port numbers. To define a flow, all the available matching fields may be used. But it is also possible to restrict the matching rule to a subset of the available fields by using wildcards for the unwanted fields.

The actions that are defined by the specification of Open-Flow 1.0 are Drop, which drops the matching packets; Forward, which forwards the packet to one or all outgoing ports, the incoming physical port itself, the controller via the secure channel, or the local networking stack (if it exists). OpenFlow 1.0 protocol data units (PDUs) are defined with a set of structures specified using the C programming language. Some of the more commonly used messages are: report switch configuration message; modify state messages (including a modify flow entry message and port modification message); read state messages, where while the system is running, the datapath may be queried about its current state using this message; and send packet message, which is used when the controller wishes to send a packet out through the datapath.

OpenFlow 1.0 supports "vendor extensions" that allow certain protocol elements to be extended. Protocol messages and table actions can be extended, but flow-matching rules cannot. The use of these extensions in connection with the cloud based EPC architecture is discussed further herein below.

OpenFlow 1.1 Networks

Figure 3:
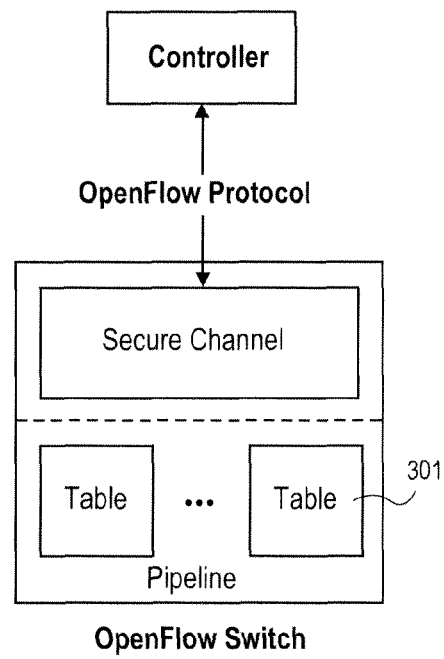
FIG. 3 illustrates another example architecture implementing OpenFlow.

FIG. 3 illustrates another example architecture implementing OpenFlow, conforming to the OpenFlow 1.1 specification. In this embodiment, there is an explicit provision for multiple flow tables 301. This allows the packet processing pipeline to mix and match particular rules and actions without causing a combinatorial explosion in the table size. For example, one flow table can perform QoS processing while a second flow table does routing.

Figure 4:
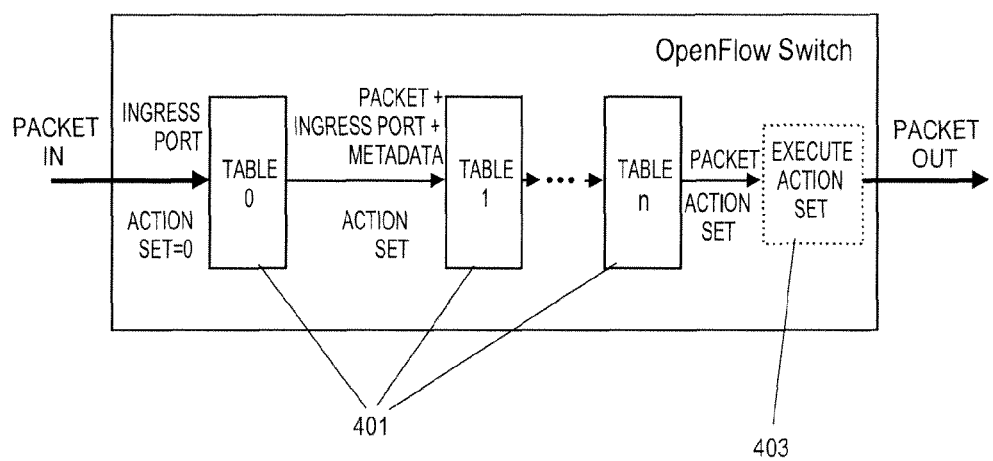
FIG. 4 illustrates one embodiment of the processing of packets through an OpenFlow switch packet processing pipeline.

FIG. 4 illustrates one embodiment of the processing of packets through an OpenFlow 1.1 switched packet processing pipeline. A received packet is compared against each of the flow tables 401. After each flow table match, the actions are accumulated into an action set. If processing requires matching against another flow table, the actions in the matched rule include an action directing processing to the next table in the pipeline. Absent the inclusion of an action in the set to execute all accumulated actions immediately, the actions are executed at the end 403 of the packet processing pipeline. An action allows the writing of data to a metadata register, which is carried along in the packet processing pipeline like the packet header.

FIG. 5 is a flowchart of one embodiment of the OpenFlow 1.1 rule matching process. OpenFlow 1.1 contains support for packet tagging. OpenFlow 1.1 allows matching based on header fields and multi-protocol label switching (MPLS) labels. One virtual LAN (VLAN) label and one MPLS label can be matched per table. The rule matching process is initiated with the arrival of a packet to be processed (Block 501). Starting at the first table 0 a lookup is performed to determine a match with the received packet (Block 503). If there is no match in this table, then one of a set of default actions is taken (i.e., send packet to controller, drop the packet or continue to next table) (Block 509). If there is a match, then an update to the action set is made along with counters, packet or match set fields and meta data (Block 505). A check is made to determine the next table to process, which can be the next table sequentially or one specified by an action of a matching rule (Block 507). Once all of the tables have been processed, then the resulting action set is executed (Block 511).

FIG. 6 is a diagram of the fields, which a matching process can utilize for identifying rules to apply to a packet. Actions allow manipulating of tag stacks by pushing and popping labels. Combined with multiple tables, VLAN or MPLS label stacks can be processed by matching one label per table.

Figure 7A:
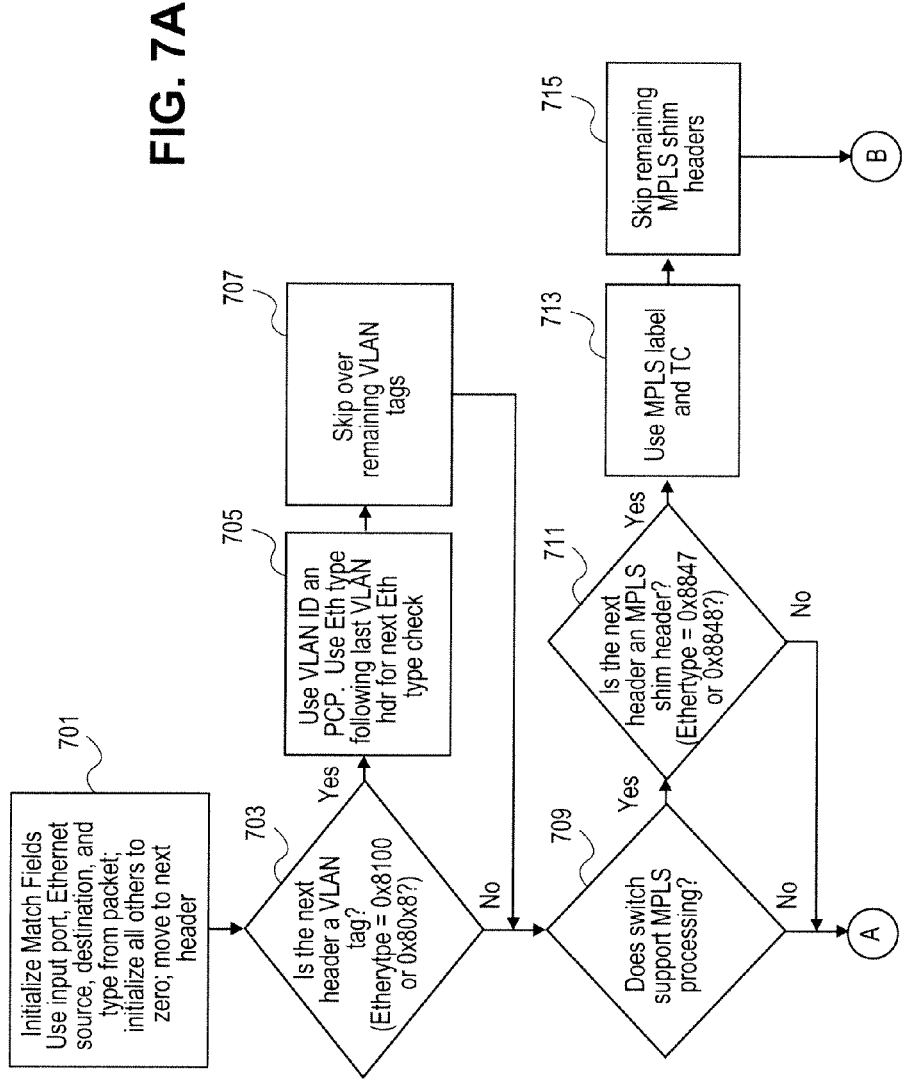

FIG. 7 is a flow chart of one embodiment of a header parsing process. The parsing process matches a packet header by initializing a set of match fields (Block 701) and checking for the presence of a set of different header types. The process checks for a VLAN tag (Block 703). If the VLAN tag is present, then there are a series of processing steps for the VLAN tag (Blocks 705-707). If the switch supports MPLS (Block 709), then there are a series of steps for detecting and processing the MPLS header information (Blocks 711-715). If the switch supports address resolution protocol (ARP), then there are a series of steps for processing the ARP header (Blocks 719 and 721). If the packet has an IP header (Block 723), then there are a series of steps for processing the IP header (Blocks 725-733). This process is performed for each received packet.

In one embodiment, a group table can be supported in conjunction with the OpenFlow 1.1 protocol. Group tables enable a method for allowing a single flow match to trigger forwarding on multiple ports. Group table entries consist of four fields: a group identifier, which is a 32 bit unsigned integer identifying the group; a group type that determines the group's semantics; counters that maintain statistics on the group; and an action bucket list, which is an ordered list of action buckets, where each bucket contains a set of actions to execute together with their parameters.

There are four different types of groups: All, which execute all actions in the bucket list, this is used for broadcast or multicast forwarding; Select, which execute one bucket per packet, based on an algorithm determined by the switch which is outside the OpenFlow protocol, this is used to implement multipath forwarding; Indirect, which execute the single bucket on all packets, this allows multiple flows or groups to point to a single collection of actions rather than having the actions defined in multiple forwarding table entries; Fast Failover, which execute the first live bucket, where each bucket is associated with a port that controls its liveness, this enables the switch to failover to another port without involving the controller.

OpenFlow 1.1 can be utilized to support virtual ports. A virtual port, as used herein, is an "action block" that performs some kind of processing action other than simply forwarding the packet out to a network connection like physical ports do. Examples of a few built-in virtual ports include: ALL, which forwards the port out all ports except for the ingress port and any ports that are marked "Do Not Forward;" CONTROLLER, which encapsulates the packet and sends it to the controller; TABLE, which inserts the packet into the packet processing pipeline by submitting it to the first flow table, this action is only valid in the action set of a packet-out message; and IN_PORT, which sends the packet out the ingress port. In other embodiments, there can also be switched-defined virtual ports.

3G PC Architecture

Figure 8:
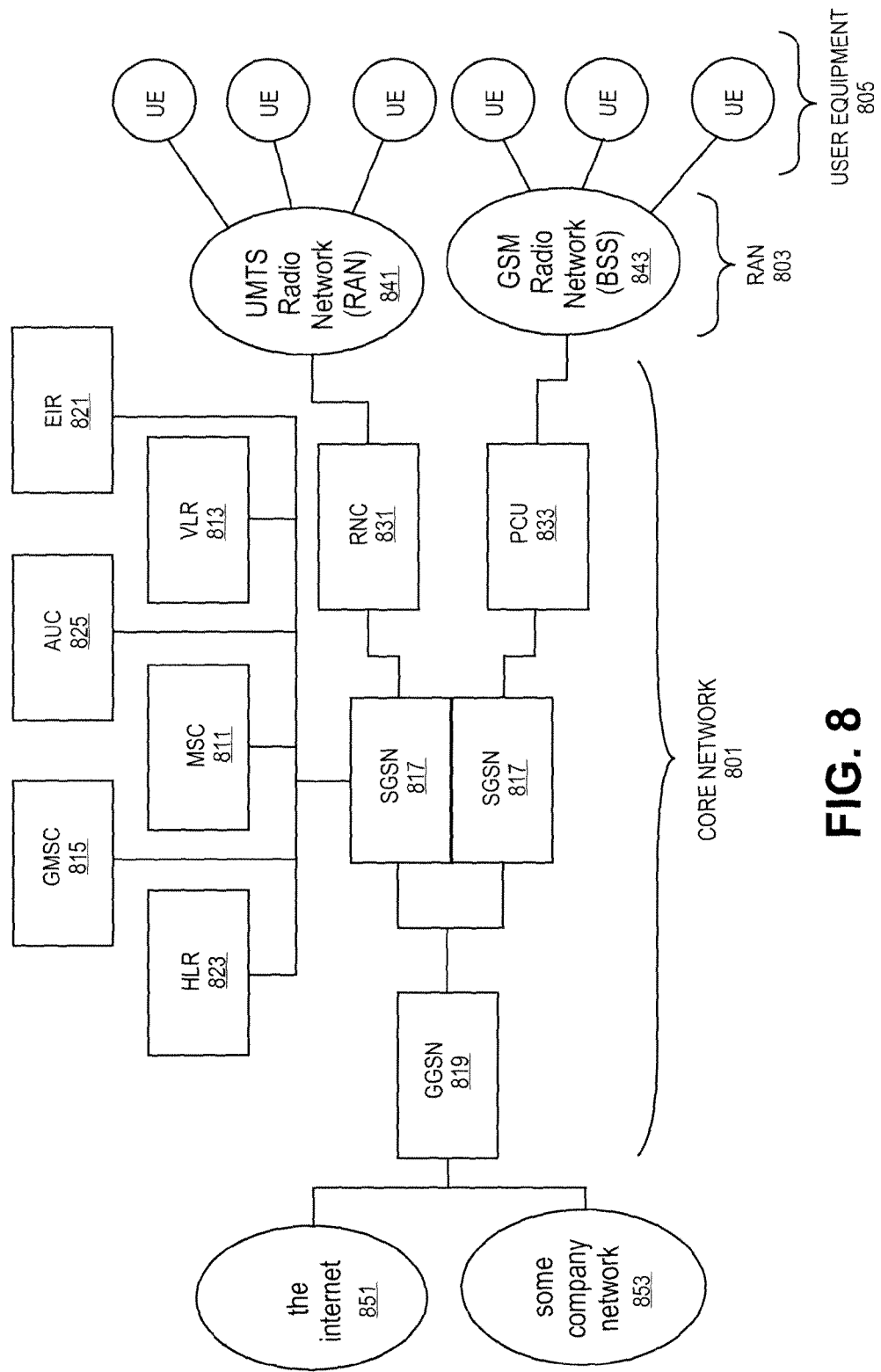
FIG. 8 is a diagram of one embodiment of a third generation (3G) packet core (PC).

FIG. 8 is a diagram of one embodiment of a 3G packet core (3G PC) network. A 3G PC network consist of three interacting domains: a core network (CN) 801 a radio access network (RAN) 803 and User Equipment (UE) 805. The user equipment 805 can be computing devices, cellular phones and similar devices. The radio access networks 803 can be any number or combination of networks including universal mobile telecommunications system (UMTS) 841 or global systems for mobile communications (GSM) networks 843. These networks can interface with the core network 801 through a radio network center (RNC) 831 or a packet control unit (PCU) 833.

The main function of the core network 801 is to provide switching, routing and transit for user traffic from the user equipment 805. The core network 801 also contains databases and network management functions. It is the common packet core network for GSM/GPRS, wideband code division multiple access (WCDMA)/high speed packet access (HSPA) and non-3GPP mobile networks. The core network 801 is used for transmitting Internet Protocol (IP) packets. The core network 801 interfaces with the Internet 851 and other networks 853 through the GGSN 819.

The core network 801 is divided into circuit switched and packet switched domains. The circuit switched elements include a mobile services switching centre (MSC) 811, visitor location register (VLR) 813 and Gateway MSC 815. Packet switched elements are SGSNs 817 and GGSN 819. Other network elements, like EIR 821, HLR 823, VLR 813 and AUC 825 are shared by both domains.

The architecture of the core network 801 can change when new services and features are introduced. In other embodiments, a number portability database (NPDB) can be used to enable a user to change networks while keeping an old phone number. A gateway location register (GLR) can be used to optimize the subscriber handling between network boundaries.

The primary functions of the core network 801 with respect to mobile wireless networking are mobility management and QoS. These functions are not typically provided in a fixed broadband network, but they are crucial for wireless networks. Mobility management is necessary to ensure packet network connectivity when a wireless terminal moves from one base station to another. QoS is necessary because, unlike fixed networks, the wireless link is severely constrained in how much bandwidth it can provide to the terminal, so the bandwidth needs to be managed more tightly than in fixed networks in order to provide the user with acceptable quality of service.

The signaling for implementing the mobility management and QoS functions is provided by the GPRS Tunneling Protocol (GTP). GTP has two components: GTP-C—a control plane protocol that supports establishment of tunnels for mobility management and bearers for QoS management that matches wired backhaul and packet core QoS to radio link QoS; and GTP-U—a data plane protocol used for implementing tunnels between network elements that act as routers. There are two versions of GTP-C protocol, i.e. GTP version 1 (GTPv1-C and GTPv1-U) and GTP version 2-C (designed for LTE). GTPv1 is primarily utilized in conjunction with the 3G PC based system.

Network Services are considered to be end-to-end, this means from a Terminal Equipment (TE) to another TE. An End-to-End Service may have a certain Quality of Service (QoS) which is provided for the user of a network service. It is the user that decides whether he is satisfied with the provided QoS or not. To realize a certain network QoS Service with clearly defined characteristics and functionality is to be set up from the source to the destination of a service.

In addition to the QoS parameters, each bearer has an associated GTP tunnel. A GTP tunnel consists of the IP address of the tunnel endpoint nodes (radio base station, SGSN, and GGSN), a source and destination UDP port, and a Tunnel Endpoint Identifier (TEID). GTP tunnels are unidirectional, so each bearer is associated with two TEIDs, one for the uplink and one for the downlink tunnel. One set of GTP tunnels (uplink and downlink) extends between the radio base station and the SGSN and one set extends between the SGSN and the GGSN. The UDP destination port number for GTP-U is 2152 while the destination port number for GTP-C is 2123. The source port number is dynamically allocated by the sending node. FIG. 9 is a diagram of one embodiment of the header fields in the primary GTP-U encapsulation header.

Cloud Computing

Data centers offer computing, storage, and network communication resources to outside customers. The offered services can consist of elastic, on demand processing, storage that for most practical purposes is limited only by the customer's ability to pay, and network bandwidth into the Internet. This set of services provided by a data center is referred to herein as cloud computing.

Server virtualization technology allows a pool of servers to be managed as essentially one large compute resource. A layer of software called a hypervisor sits between the operating system and the hardware. The hypervisor schedules the execution of virtual machines (VMs). A VM is an operating system image packaged with some applications. The hypervisor allows a VM to be suspended and moved between servers to load balance. Load balancing and monitoring of VM execution to catch crashes provides the same kind of fault tolerance and scalability services for enterprise applications that are achieved at much higher cost with specialized solutions. A cloud manager system oversees the execution of VMs, the scheduling of execution to meet the demand of the VMs and the optimization of server utilization and minimization of power consumption. The cloud manager or cloud operating system is a software program that can schedule execution to allow an in-service upgrade of hardware and software without impacting ongoing service provisioning to the VMs and their applications in the cloud computing system.

To support the arbitrary movement of VMs between machines, the networking within the data center must also be virtualized. Cloud computing systems can virtualize the network by incorporating a virtual switch into the hypervisor. The virtual switch provides virtual network ports to the VMs executing under the control of the hypervisor. The virtual switch software also allows the network resources to be virtualized in a manner similar to how the server resources are virtualized by the hypervisor. The hypervisor and the virtual switch can thereby co-operate to allow VMs to be moved between servers. When the hypervisor moves a VM, it communicates with the virtual switch about the new location, and the virtual switch ensures that the network routing tables for the VM's addresses (L2 MAC address, potentially also the IP address) are updated so packets are routed to the new location.

A cloud computing system can be composed of any number of computing devices having any range of capabilities (e.g., processing power or storage capacity). The cloud computing system can be a private or public system. The computing devices can be in communication with one another across any communication system or network. A cloud computing system can support a single cloud or service or any number of discrete clouds or services. Services, applications and similar programs can be virtualized or executed as standard code. In one embodiment, cloud computing systems can support web services applications. Web services applications consist of a load balancing front end that dispatches requests to a pool of Web servers. The requests originate from applications on remote machines on the Internet and therefore the security and privacy requirements are much looser than for applications in a private corporate network.

Cloud computer systems can also support secure multi-tenancy, in which the cloud computer system provider offers virtual private network (VPN)-like connections between the client's distributed office networks outside the cloud and a VPN within the cloud computing system. This allows the client's applications within the cloud computing system to operate in a network environment that resembles a corporate WAN. For private data centers, in which services are only offered to customers within the corporation owning the data center, the security and privacy requirements for multi-tenancy are relaxed. But for public data centers, the cloud operator must ensure that the traffic from multiple tenants is isolated and there is no possibility for traffic from one client to reach another client network.

Figure 10:
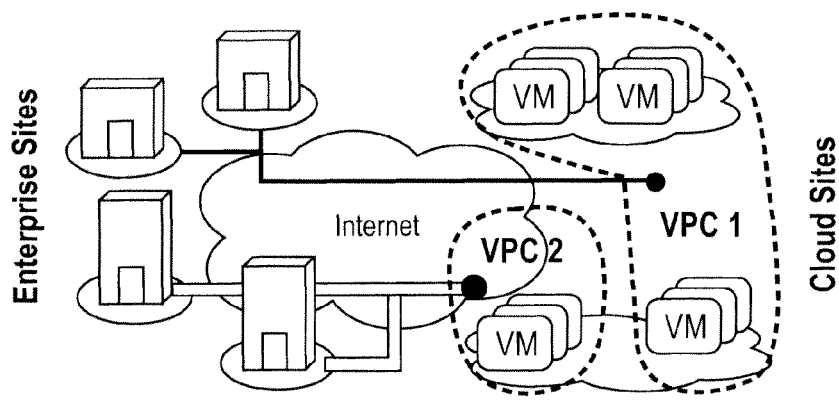
FIG. 10 is a diagram of one embodiment of a cloud computing system servicing a set of clients.

FIG. 10 is a diagram of one embodiment of a cloud computing system servicing a set of clients. A 'set,' as used herein, refers to any positive whole number of items. In the embodiment, shown in FIG. 10, two virtual private clouds (VPCs) are set up for two different external enterprise customers. A VPC consists of a collection of VMs, storage, and networking resources that provide secure multi-tenancy to the enterprises renting space in the cloud. The enterprise customers connect into the VPCs via VPNs over the Internet running on a public operator network.

Figure 11:
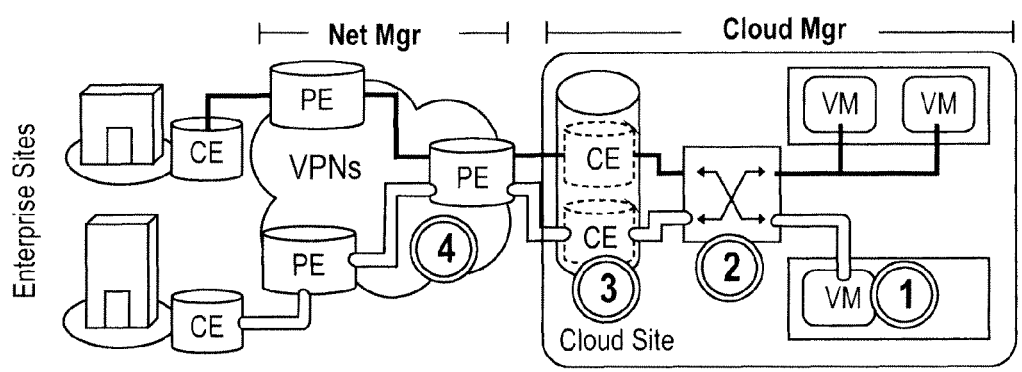
FIG. 11 is a diagram of another embodiment of a cloud computing system showing the process of adding a new service instance to a client's VPC.

FIG. 11 is a diagram of another embodiment of a cloud computing system showing the process of adding a new service instance to a client's VPC. In this case, the in-cloud VPN is implemented using MAC layer Virtual LANs (VLANs). The VM is created on a hypervisor managed server with in the VPC for the enterprise requesting the new service instance (step 1). The virtual switch VLAN is configured to include the new VM into the enterprise in-cloud VPN, thereby establishing service connectivity within the cloud (step 2). The virtual customer edge router (CE) is updated for the new service (step 3). The provider edge router in the operator network where the enterprise VPN is run is updated with the new service (step 4).

3G PC Implementation in Cloud Computing System

Figure 12:
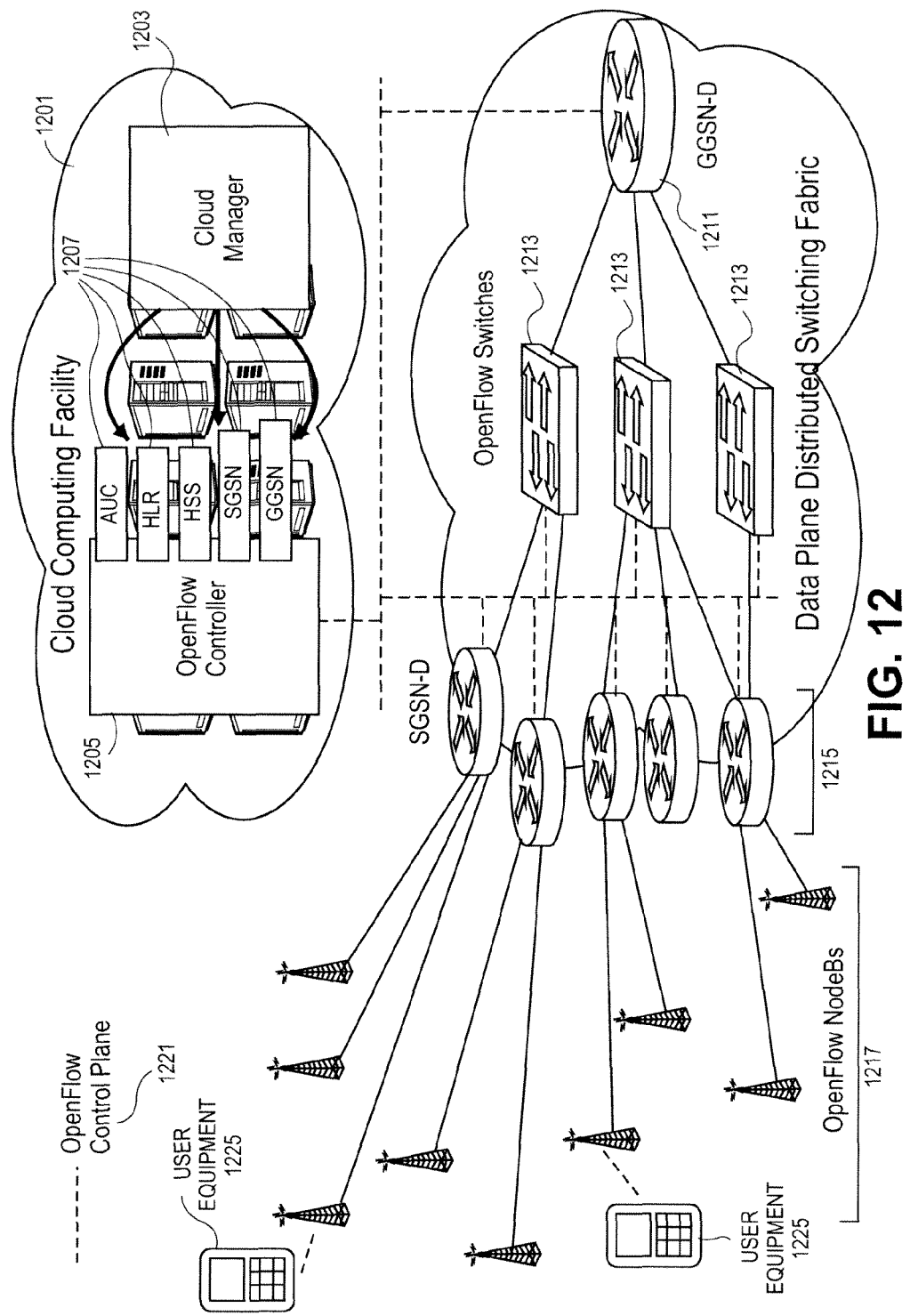
FIG. 12 is a diagram of one embodiment of the 3G PC implemented in the cloud computing system.

FIG. 12 is a diagram of one embodiment of the EPC implemented in the cloud computing system. The 3G PC control plane entities (AUC, HLR, HSS) 1207 and the control plane parts of the support nodes (SGSN, GGSN) 1207, i.e. the parts that handle GTP signaling, are implemented in the cloud computing system 1201 as part of the OpenFlow controller 1205. The control plane entities 1207 and the OpenFlow controller 1205 are packaged as VMs. The application programming interface (API) between the OpenFlow controller 1205 and the control plane entities 1207 can be a remote procedure call (RPC) interface or similar interface. This implementation technology is favorable for scalable management of the control plane entities within the cloud, since it allows execution of the control plane entities 1207 and the controller 1205 to be managed separately according to demand. The cloud manager 1203 can be a VM or an application executed within the cloud computing system 1201.

The cloud manager 1203 monitors the central processor unit (CPU) utilization of the 3G PC control plane entities 1207 and the control plane traffic between the 3G PC control plane entities 1207 within the cloud. It also monitors the control plane traffic between the end user devices (UEs) 1225 and NodeBs 1217, which do not have control plane entities in the cloud computing system 1201, and the 3G PC control plane entities 1207. If the 3G PC control plane entities 1207 begin to exhibit signs of overloading, such as the utilization of too much CPU time, or the queueing up of too much traffic to be processed, the overloaded control plane entity 1207 requests that the cloud manager 1203 start up a new VM to handle the load. Additionally, the 3G PC control plane entities 1207 themselves can issue event notifications to the cloud manager 1203 if they detect internally that they are beginning to experience overloading.

The cloud manager 1203 also provides reliability and failover by restarting a VM for a particular control plane entity 1207 or function if any of the 3G PC control plane entities 1207 should crash. During this restart process the cloud manager can collect diagnostic data, save any core files of the failed 3G PC control plane entity, and inform the system administrators that a failure occurred. The control plane entities 1207 maintains the same protocol interface between themselves as in the 3GPP 3G PC architecture shown in FIG. 8.

The OpenFlow control plane 12321, shown here as a dotted line, manages the routing and switching configuration in the network. The OpenFlow control plane 1221 connects the cloud computing system 1203 to the SGSN-Ds 1215 (i.e., the data plane of the SGSN), the standard OpenFlow switches 1213, and the GGSN-D 1211 (i.e., the data plane of the GGSN). The physical implementation of the OpenFlow control plane 1221 can be as a completely separate physical network, or it may be a virtual network running over the same physical network as the data plane, implemented with a prioritized VLAN or with an MPLS label switched path or even with a generic routing encapsulation (GRE) or other IP tunnel. The OpenFlow control plane 1221 can in principle use the same physical control plane paths as the GTP-C and other mobile network signaling. The SGSN-Ds 1215 and the GGSN-Ds 1211 act as OpenFlow GTP-extended gateways, encapsulating and decapsulating packets using the OpenFlow GTP switch extensions described further herein below.

The NodeBs 1217 have no control plane entities in the cloud because the radio access network (RAN) signaling required between the 3G PC and the NodeB includes radio parameters, and not just IP routing parameters. Therefore, there is no OpenFlow control plane 1221 connection between the OpenFlow controller 1205 in the cloud computing system 1201 and the NodeBs 1217. The NodeBs 1217 can however act as OpenFlow GTP-extended gateways by implementing a local control to data plane connection using OpenFlow. This allows the packet switching side of the NodeBs 1217 to utilize the same OpenFlow GTP switching extensions as the packet gateways.

The operation of the 3G PC cloud computer system works as follows. The UE 1225, NodeB 1217, SGSN 1207 and GGSN signal 1207 to the HLR, HSS, AUC, SMS-GMSC 1207 using the standard 3G PC protocols, to establish, modify, and delete GTP tunnels. This signaling triggers procedure calls with the OpenFlow controller to modify the routing in the 3G PC as requested. The OpenFlow controller configures the standard OpenFlow switches, the Openflow SGSN 1215, and GGSN 1211 with flow rules and actions to enable the routing requested by the control plane entities. Details of this configuration are described in further detail herein below.

Figure 13:
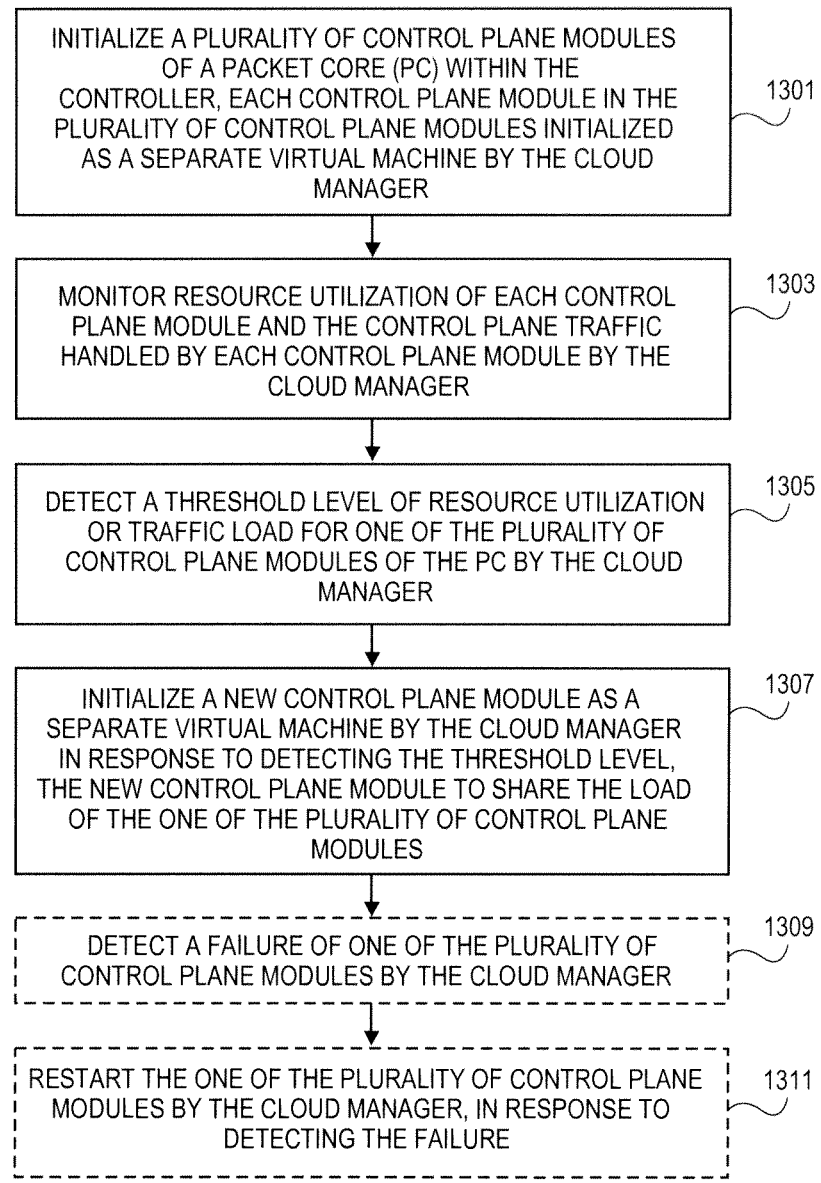
FIG. 13 is a flowchart of one embodiment of a process for the basic operation of the 3G PC network.

FIG. 13 is a flowchart of one embodiment of the basic operation of the 3G PC. In one embodiment, the process begins with the initialization of the control plane modules of the 3G PC within the OpenFlow controller in the cloud computing system (Block 13401). Each control plane module in the plurality of control plane modules is initialized as a separate VM by the cloud manager. The cloud manager then monitors the resource utilization of each control plane module as well as the amount and type of control plane traffic handled by each control plane module (Block 1303). The cloud manager can directly monitor this data, receive reports from the control plane modules or any combination thereof.

If the cloud manager detects a threshold level of resource utilization or traffic load for any one of the plurality of control plane modules being monitored (Block 1205), the cloud manager can takes steps to automatically respond to this scenario. The cloud manager can initialize a new control plane module or an instance of such a control plane module as a separate virtual machine (Block 1207). This new control plane module or instance can then share the load of existing control plane modules or instances of the same type thereby alleviating the load on these modules dynamically.

Similarly, the cloud manager may detect the failure or the underutilization of one of the plurality of control plane modules (Block 1209). The cloud manager can then restart a failed control plane module or terminate an underutilized control plane module (Block 1211). Restarting the control plane module ensures a level of load sharing for a pool of control plane modules. Deactivating a control plane module frees up the resources and reduces the overhead created by the control plane module. The cloud manager can perform these functions across VPCs and mobile operators using the cloud computing system resources, thereby maximizing the use of available resources and reducing the cost of operation while maintaining strict separation of data and traffic between mobile operators.

Figure 14:
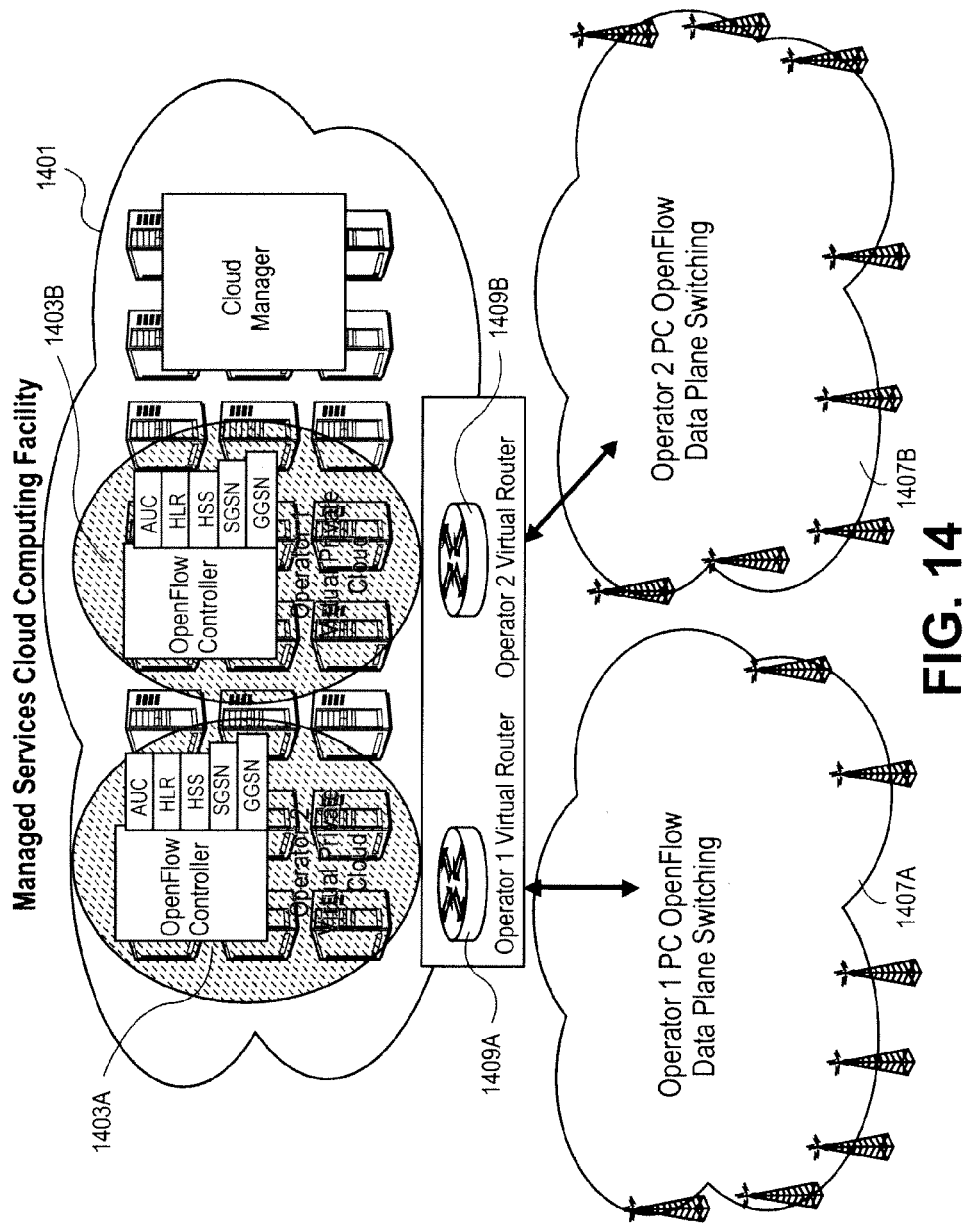
FIG. 14 is a diagram of one embodiment of how the 3G PC in the cloud computing system enables a managed services company to manage multiple operator networks out of a single data center.

FIG. 14 is a diagram of one embodiment of how the 3G PC in the cloud computing system enables a managed services company to manage multiple operator networks out of a single data center. The managed services cloud computing facility 1401 runs separate instances of the 3G PC control plane for every mobile operator with which the managed services company has a contract. Each 3G PC instance is in a VPC 1403A,B that isolates the mobile operator's traffic from other tenants in the cloud computing facility 1401 of the data center. The 3G PC control plane instance for a mobile operator is connected to the mobile operator's geographically distributed 3G PC OpenFlow data plane switching fabric 1407A,B and the mobile operator's base stations through a virtual edge router 1409A,B. The virtual edge router 1409A,B routes traffic from the data center to and from the appropriate mobile operator 3G PC data plane switching fabric 1407A,B. In some cases, the mobile operators may even share base stations and 3G PC switching fabrics, though the example embodiment in FIG. 14 shows a case where the two mobile operators have separate switching fabrics.

3G PC Peering and Differential Routing in a Cloud Computing System

Figure 15:
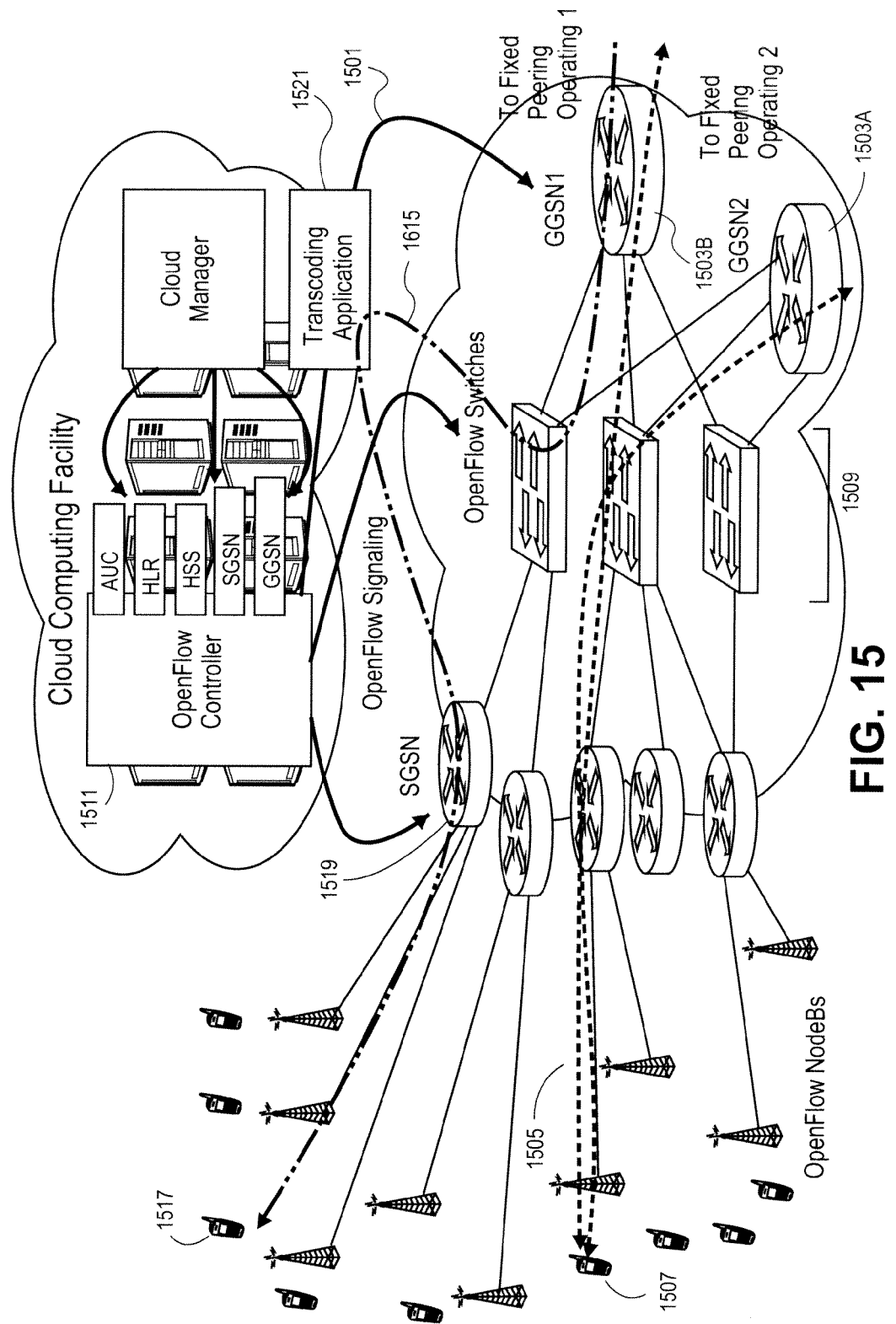
FIG. 15 is a diagram of one embodiment of a process for 3G PC peering and differential routing for specialized service treatment.

FIG. 15 is a diagram of one embodiment of a process for 3G PC peering and differential routing for specialized service treatment. The OpenFlow signaling, indicated by the solid lines and arrows 1501, sets up flow rules and actions on the switches and gateways within the 3G PC for differential routing. These flow rules direct GTP flows to particular locations. In this example, the operator in this case peers its 3G PC with two other fixed operators. Routing through each peering point is handled by the respective GGSN1 and GGSN2 1503A, B. The dashed lines and arrows 1505 show traffic from a UE 1507 that needs to be routed to another peering operator. The flow rules and actions to distinguish which peering point the traffic should traverse are installed in the OpenFlow switches 1509 and gateways 1503A, B by the OpenFlow controller 1511. The OpenFlow controller 1511 calculates these flow rules and actions based on the routing tables it maintains for outside traffic, and the source and destination of the packets, as well as by any specialized forwarding treatment required for DSCP marked packets.

The long dash and dotted lines and arrows 1515 shows a example of a UE 1517 that is obtaining content from an external source. The content is originally not formulated for the UE's 1517 screen, so the OpenFlow controller 1511 has installed flow rules and actions on the GGSN1 1503B, SGSN 1519 and the OpenFlow switches 1509 to route the flow through a transcoding application 1521 in the cloud computing facility. The transcoding application 1521 reformats the content so that it will fit on the UE's 1517 screen. A MSC requests the specialized treatment at the time the UE sets up its session with the external content source via the IP Multimedia Subsystem (IMS) or another signaling protocol.

GTP TEID Routing

In one embodiment, OpenFlow is modified to provide rules for GTP TEID Routing. FIG. 16 is a diagram of one embodiment of the OpenFlow flow table modification for GTP TEID routing. An OpenFlow switch that supports TEID routing matches on the 2 byte (16 bit) collection of header fields and the 4 byte (32 bit) GTP TEID, in addition to other OpenFlow header fields, in at least one flow table (e.g., the first flow table). The GTP TEID flag can be wildcarded (i.e. matches are "don't care"). In one embodiment, the 3G PC protocols do not assign any meaning to TEIDs other than as an endpoint identifier for tunnels, like ports in standard UDP/TCP transport protocols. In other embodiments, the TEIDs can have a correlated meaning or semantics. The GTP header flags field can also be wildcarded, this can be partially matched by combining the following bitmasks: 0xFF00—Match the Message Type field; 0xe0—Match the Version field; 0x10—Match the PT field; 0x04—Match the E field; 0x02—Match the S field; and 0x01—Match the PN field.

In one embodiment, OpenFlow can be modified to support virtual ports for fast path GTP TEID encapsulation and decapsulation. An OpenFlow mobile gateway can be used to support GTP encapsulation and decapsulation with virtual ports. The GTP encapsulation and decapsulation virtual ports can be used for fast encapsulation and decapsulation of user data packets within GTP-U tunnels, and can be designed simply enough that they can be implemented in hardware or firmware. For this reason, GTP virtual ports may have the following restrictions on traffic they will handle: Protocol Type (PT) field=1, where GTP encapsulation ports only support GTP, not GTP' (PT field=0); Extension Header flag (E)=0, where no extension headers are supported, Sequence Number flag (S)=0, where no sequence numbers are supported; N-PDU flag (PN)=0; and Message type=255, where Only G-PDU messages, i.e. tunneled user data, is supported in the fast path.

If a packet either needs encapsulation or arrives encapsulated with nonzero header flags, header extensions, and/or the GTP-U packet is not a G-PDU packet (i.e. it is a GTP-U control packet), the processing must proceed via the gateway's slow path (software) control plane. GTP-C and GTP' packets directed to the gateway's IP address are a result of mis-configuration and are in error. They must be sent to the OpenFlow controller, since these packets are handled by the SGSN and GGSN control plane entities in the cloud computing system or to the billing entity handling GTP' and not the SGSN and GGSN data plane switches.

GTP virtual ports are configured from the OpenFlow controller using a configuration protocol. The details of the configuration protocol are switch-dependent. The configuration protocol must support messages that perform the following functions: allow the controller to query for and return an indication whether the switch supports GTP fast path virtual ports and what virtual port numbers are used for fast path and slow path GTP-U processing; and allow the controller to instantiate a GTP-U fast path virtual port within a switch datapath for use in the OpenFlow table set-output-port action. The configuration command must be run in a transaction so that, when the results of the action are reported back to the controller, either a GTP-U fast path virtual port for the requested datapath has been instantiated or an error has returned indicating why the request could not be honored. The command also allows the OpenFlow controller to bind a GTP-U virtual port to a physical port. For decapsulation virtual ports, the physical port is an input port. For encapsulation virtual ports, the physical port is an output port.

The OpenFlow controller instantiates a virtual port for each physical port that may transmit or receive packets routed through a GTP tunnel, prior to installing any rules in the switch for GTP TEID routing.

In one embodiment, an OpenFlow GTP gateway maintains a hash table mapping GTP TEIDs into the tunnel header fields for their bearers. FIG. 17 is a diagram of the structure of a flow table row. The TEID hash keys are calculated using a suitable hash algorithm with low collision frequency, for example SHA-1. The gateway maintains one such flow table row for each GTP TEID/bearer. The TEID field contains the GTP TEID for the tunnel. The VLAN tags and MPLS labels fields contain an ordered list of VLAN tags and/or MPLS labels defining tunnels into which the packet needs to be routed. The VLAN priority bits and MPLS traffic class bits are included in the labels. Such tunnels may or may not be required. If they are not required, then these fields are empty. The tunnel origin source IP address contains the address on the encapsulating gateway to which any control traffic involving the tunnel should be directed (for example, error indications). The tunnel end destination IP address field contains the IP address of the gateway to which the tunneled packet should be routed, at which the packet will be decapsulated and removed from the GTP tunnel. The QoS DSCP field contains the DiffServe Code Point, if any, for the bearer in the case of a dedicated bearer. This field may be empty if the bearer is a default bearer with best effort QoS, but will contain nonzero values if the bearer QoS is more than best effort.

In one embodiment, slow path support for GTP is implemented with an OpenFlow gateway switch. An OpenFlow mobile gateway switch also contains support on the software control plane for slow path packet processing. This path is taken by G-PDU (message type 255) packets with nonzero header fields or extension headers, and user data plane packets requiring encapsulation with such fields or addition of extension headers, and by GTP-U control packets. For this purpose, the switch supports three local ports in the software control plane: LOCAL_GTP_CONTROL—the switch fast path forwards GTP encapsulated packets directed to the gateway IP address that contain GTP-U control messages and the local switch software control plane initiates local control plane actions depending on the GTP-U control message; LOCAL_GTP_U_DECAP—the switch fast path forwards G-PDU packets to this port that have nonzero header fields or extension headers (i.e. E !=0, S !=0, or PN !=0). These packets require specialized handling. The local switch software slow path processes the packets and performs the specialized handling; and LOCAL_GTP_U_ENCAP—the switch fast path forwards user data plane packets to this port that require encapsulation in a GTP tunnel with nonzero header fields or extension headers (i.e. E !=0, S !=0, or PN !=0). These packets require specialized handling. The local switch software slow path encapsulates the packets and performs the specialized handling. In addition to forwarding the packet, the switch fast path makes the OpenFlow metadata field available to the slow path software.

To support slow path encapsulation, the software control plane on the switch maintains a hash table with keys calculated from the GTP-U TEID. The TEID hash keys are calculated using a suitable hash algorithm with low collision frequency, for example SHA-1. The flow table entries contain a record of how the packet header, including the GTP encapsulation header, should be configured. This includes: the same header fields as for the hardware or firmware encapsulation table in FIG. 18; values for the GTP header flags (PT, E, S, and PN); the sequence number and/or the N-PDU number if any; if the E flag is 1, then the flow table contains a list of the extension headers, including their types, which the slow path should insert into the GTP header.

In one embodiment, the system implements a GTP fast path encapsulation virtual port. When requested by the SGSN and GGSN control plane software running in the cloud computing system, the OpenFlow controller programs the gateway switch to install rules, actions, and TEID hash table entries for routing packets into GTP tunnels via a fast path GTP encapsulation virtual port. The rules match the packet filter for the input side of GTP tunnel's bearer. Typically this will be a 4 tuple of: IP source address; IP destination address; UDP/TCP/SCTP source port; and UDP/TCP/SCTP destination port. The IP source address and destination address are typically the addresses for user data plane traffic, i.e. a UE or Internet service with which a UE is transacting, and similarly with the port numbers. For a rule matching the GTP-U tunnel input side, the associated instructions and are the following:

Write-Metadata (GTP-TEID, 0xFFFFFFFF)

Apply-Actions (Set-Output-Port GTP-Encap-VP)

The switch also writes an entry in the TEID hash table containing the tunnel header fields for the packet. GTP-TEID is the GTP tunnel endpoint identifier. GTP-Enacup-VP is the GTP fast path encapsulation virtual port bound to the physical port out which the encapsulated packet will ultimately be routed.

When a packet header matches a rule associated with the virtual port, the GTP TEID is written into the lower 32 bits of the metadata and the packet is directed to the virtual port. The virtual port calculates the hash of the TEID and looks up the tunnel header information in the tunnel header table. If no such tunnel information is present, the packet is forwarded to the controller with an error indication. Otherwise, the virtual port constructs a GTP tunnel header and encapsulates the packet. Any DSCP bits or VLAN priority bits are additionally set in the IP or MAC tunnel headers, and any VLAN tags or MPLS labels are pushed onto the packet. The encapsulated packet is forwarded out the physical port to which the virtual port is bound.

In one embodiment, the system implements a GTP fast path decapsulation virtual port. When requested by the SGSN and GGSN control plane software running in the cloud computing system, the gateway switch installs rules and actions for routing GTP encapsulated packets out of GTP tunnels. The rules match the GTP header flags and the GTP TEID for the packet, in the modified OpenFlow flow table shown in FIG. 16 as follows: the IP destination address is an IP address on which the gateway is expecting GTP traffic; the IP protocol type is UDP (17); the UDP destination port is the GTP-U destination port (2152); and the header fields and message type field is wildcarded with the flag 0XFFF0 and the upper two bytes of the field match the G-PDU message type (255) while the lower two bytes match 0x30, i.e. the packet is a GTP packet not a GTP' packet and the version number is 1. The virtual port simply removes the GTP tunnel header and forwards the enclosed user data plane packet out the bound physical port.

In one embodiment, the system implements handling of GTP-U control packets. The OpenFlow controller programs the gateway switch flow tables with 5 rules for each gateway switch IP address used for GTP traffic. These rules contain specified values for the following fields: the IP destination address is an IP address on which the gateway is expecting GTP traffic; the IP protocol type is UDP (17); the UDP destination port is the GTP-U destination port (2152); the GTP header flags and message type field is wildcarded with 0xFFF0; the value of the header flags field is 0x30, i.e. the version number is 1 and the PT field is 1; and the value of the message type field is one of 1 (Echo Request), 2 (Echo Response), 26 (Error Indication), 31 (Support for Extension Headers Notification), or 254 (End Marker).

The instruction associated with a match to one of these rules is:

Apply-Actions (Set-Output-Port LOCAL_GTP_CONTROL)

This causes the packet to be forwarded to the gateway switch's local GTP-U control port for processing by the local software control plane. GTP-U control packets that are originated by the switch are generated on the software control plane and are routed by the control plane.

In one embodiment, the system implements handling of G-PDU packets with extension headers, sequence numbers, and N-PDU numbers. G PDU packets with extension headers, sequence numbers, and N-PDU numbers need to be forwarded to the local switch software control plane for processing. The OpenFlow controller programs 3 rules for this purpose. They have the following common header fields: the IP destination address is an IP address on which the gateway is expecting GTP traffic; and the IP protocol type is UDP (17); the UDP destination port is the GTP-U destination port (2152).

The header flags and message type fields for the three rules are wildcarded with the following bitmasks and match as follows: bitmask 0xFFF4 and the upper two bytes match the G-PDU message type (255) while the lower two bytes are 0x34, indicating that the version number is 1, the packet is a GTP packet, and there is an extension header present; bitmask 0xFFF2 and the upper two bytes match the G-PDU message type (255) while the lower two bytes are 0x32, indicating that the version number is 1, the packet is a GTP packet, and there is a sequence number present; and bitmask 0xFF01 and the upper two bytes match the G-PDU message type (255) while the lower two bytes are 0x31, indicating that the version number is 1, the packet is a GTP packet, and a N-PDU is present.

The instruction for these rules is the following:

Apply-Actions (Set-Output-Port LOCAL_GTP_U_DECAP)

This sends the packet to the software slow path GTP-U decapsulation path for special processing.

In one embodiment, the system implements handling of user data plane packets requiring GTP-U encapsulation with extension headers, sequence numbers, and N-PDU numbers. User data plane packets that require extension headers, sequence numbers, or N-PDU numbers during GTP encapsulation require special handling by the software slow path. For these packets, the OpenFlow controller programs a rule matching the 4 tuple: IP source address; IP destination address; UDP/TCP/SCTP source port; and UDP/TCP/SCTP destination port. The instructions for matching packets are:

Write-Metadata (GTP-TEID, 0xFFFFFFFF)
Apply-Actions (Set-Output-Port LOCAL_GTP_U_ENCAP)

This sends the packet to the software slow path GTP encapsulation port and, in addition, makes the TEID available to the slow path.

The OpenFlow message programming the rule insertion also includes information on the values for the sequence number, N-PDU number, or the type and contents of the extension header, as well as the packet header fields designating the decapsulation gateway and bearer transport and the GTP TEID. This information is inserted by the switch's control plane software into the software encapsulation table, keyed by the TEID.

In one embodiment, the system implements handling of GTP-C and GTP' control packets. Any GTP-C and GTP' control packets that are directed to IP addresses on a gateway switch are in error. These packets need to be handled by the SGSN, GGSN, and GTP' protocol entities in the cloud computing system, not the SGSN and GGSN entities in the switches. To catch such packets, the OpenFlow controller must program the switch with the following two rules: the IP destination address is an IP address on which the gateway is expecting GTP traffic; the IP protocol type is UDP (17); for one rule, the UDP destination port is the GTP-U destination port (2152), for the other, the UDP destination port is the GTP-C destination port (2123); the GTP header flags and message type fields are wildcarded.

These rules must be the lowest priority of all the GTP rules in the gateway switch's flow table. They will match any GTP packets that don't match other, more specific rules. The instruction for these rules is the following:

Apply-Actions (Set-Output-Port CONTROLLER)

This encapsulates the packet and sends it to the OpenFlow controller.

In one embodiment, the system implements non-gateway GTP routing. A GTP-extended Openflow switch can also accomplish GTP routing without performing the gateway functions of encapsulation and decapsulation. The GTP routing function can be performed by a gateway switch in addition to its gateway function, or it can be performed by another switch that lacks a gateway function, within the distributed EPC switching fabric.

A GTP-extended Openflow switch contains at least one flow table that handles rules matching the GTP header fields as in FIG. 16. The Openflow controller programs the GTP header field rules in addition to the other fields to perform GTP routing and adds appropriate actions if the rule is matched. For example, the following rule matches a GTP-C control packet directed to a control plane entity (MSC, SGSN, GGSN) in the cloud computing system, which is not in the control plane VLAN: the VLAN tag is not set to the control plane VLAN, the destination IP address field is set to the IP address of the targeted control plane entity, the IP protocol type is UDP (17), the UDP destination port is the GTP-C destination port (2123), the GTP header flags and message type is wildcarded with 0xF0 and the matched version and protocol type fields are 2 and 1, indicating that the packet is a GTPv1 control plane packet and not GTP'.

The following actions push a control plane VLAN tag onto the packet and forward it to the cloud for processing by the relevant control plane entity. The packet is forwarded without any L3 processing (i.e. not modifying the IP TTL):

Write-Action ( Set-VLAN-ID CP_VLAN_TAG )
Write-Action ( Set-Source-MAC-Address SWITCH_MAC_ADDR )
Write-Action ( Set-Dest-MAC-Address NEXT_HOP_MAC_ADDR )
Set-Output-Port NEXT_HOP_PORT GTP Extensions for OpenFlow The OpenFlow protocol can be modified to provide extensions for GTP that enable the management of the 3G PC. OpenFlow utilizes data structures referred to as flow match structures that enable the protocol to define criteria for matching rules to particular flows. The OpenFlow flow match structure of ofp_match, contains two fields, type and length, that allow the flow match structure to be extended. The type field can be set to the type of the extension and the length field can be set to the length of the extended ofp_match structure. In one embodiment, a new type based on a random number for GTP flow matching is defined:

```
enum ofp_match_type_ext {
    ERSMT_GTP = 48696,
};
```

The type can be been randomly generated so as not to interfere with other extended types. There is currently no organizational mechanism to register type identifiers in OpenFlow.

The ersmt_gtp structure defines the flow table fields for GTP flow routing as:

```
struct ersmt_gtp {
    unit8_t gtp_wildcard;
    uint16_t gtp_type_n_flags;
    uint16_t gtp_flag_mask;
    uint32_t gtp_teid;
};
```

The gtp_type_n_flags field contains the GTP message type in the upper 8 bits and the GTP header flags in the lower 8 bits. The gtp_teid field contains the GTP TEID. The gtp_wildcard field indicates whether the GTP type and flags and TEID should be matched. If the lower four bits are 1, the type and flags field should be ignored, while if the upper four bits are 1, the TEID should be ignored. If the lower bits are 0, the type and fields flag should be matched subject to the flags in the gtp_flag_mask field, while if the upper bits are 0 the TEID should be matched. The mask is combined with the message type and header field of the packet using logical AND; the result becomes the value of the match. Only those parts of the field in which the mask has a 1 value are matched.

In addition to the flow table fields, an object is required to encode the encapsulation of the virtual port TEID hash table entry. The ersmt_gtp_tuninfo structure can be used to define this information:

```
struct ermst_mpls_lbl {
    uint8_t mpls_lbl_low;
    uint8_t mpls_lbl_mid;
    uint8_t mpls_lbl_high;
};
struct ersmt_gtp_tuninfo {
    uint16_t gtp_tuninfo_length;
    uint32_t gtp_tuninfo_saddr;
    uint32_t gtp_tuninfo_daddr;
    uint8_t gtp_tuninfo_dscp;
    uint8_t gtp_tuninfo_vlan_len;
    unit16_t gtp_tuninfo_vlan_tags[0]; /*variable length*/
    uint8_t gtp_tuninfo_mpls_len;
    struct mpls_lbl gtp_tuninfo_mpls_labels[0]; /*variable length*/
};
```

The ermst_mpls_lbl struct provides a 24 bit data structure for encoding MPLS labels. The ersmt_gtp_tunifo structure contains fields describing a GTP tunnel. These are inserted into the encapsulation virtual port. The structure is variable length because it may contain a variable number of VLAN tags and/or MPLS labels. The gtp_tuninfo_length field contains the length of the structure. The gtp_tuninfo_saddr, gtp_tuninfo_daddr, and gtp_tuninfo_dscp fields contain the source address of the tunnel (the address of the interface on the switch performing the encapsulation), the destination address of the tunnel (the switch to which the tunneled packet will be routed and that will decapsulate the packet), and the DiffServ Code Point (if any) assigned to the tunnel's bearer. The bearer DSCP will be nonzero if the bearer is a dedicated bearer and it is not a best effort bearer.

The gtp_tuninfo_vlan_len and gtp_tuninfo_mpls_len contain the length of the VLAN tags field and the MPLS labels field, respectively. The gtp_tuninfo_vlan_tags[0] and gtp_tuninfo_mpls_labels[0] fields contain the actual VLAN tags and/or the MPLS labels that need to be pushed onto the packet's tunnel header. These fields will be absent (and the corresponding length fields will be zero) if no VLAN or MPLS Label Switched Paths (LSPs) are used for the tunnel.

In one embodiment, OpenFlow is modified to add extension messages for adding, deleting, or modifying a 3G PC bearer or GTP tunnel. The OpenFlow signaling for adding, modifying, or deleting a 3G PC bearer or GTP tunnel consists of one OpenFlow message, the ofp_flow_mod message, containing an ersmt_gtp GTP flow definition. The standard OpenFlow ofp_flow_mod message can be used as long as the OpenFlow protocol parser can handle extended flows. If the flow modification requires a change to the encapsulation virtual port TEID hash table, the OpenFlow controller must issue a GTP OpenFlow extension message containing the TEID hash table entry. The OpenFlow controller must issue both messages sequentially, the ofp_flow_mod message first, then the TEID hash table modification message, then the OpenFlow controller must issue an OFPT_BARRIER_REQUEST message to force processing of both messages by the OpenFlow switch.

The OpenFlow message extension header structure ofp_experimenter_header contains an experimenter id field, called experimenter. In one embodiment, this field can be set to the Ericsson IEEE OUI, 0x01ec or similar manufacturer or provider OUI. The rest of the structure contains the GTP extension messages. These messages can be identified by the following message codes:

```
enum ermst_gtp_message_code {
    GTP_ADD_TEID_TABLE_ENTRY = 0,
    GTP_DEL_TEID_TABLE_ENTRY = 1,
};
```

The GTP OpenFlow extension contains a message for adding and for deleting a TEID hash table entry. Entries are modified by first deleting the entry for the TEID then adding a new entry for the same TEID. The GTP OpenFlow extension message for entering a new TEID entry in the encapsulation virtual port hash table is:

```
struct ermst_teid_table_add {
    ermst_gtp_message_code teid_table_add_type;
    uint16_t teid_table_add_teid;
    struct ermst_gtp_tuninfo teid_table_add_entry;
};
```

The teid_table_add_type field is set to GTP_ADD_TEID_TABLE_ENTRY while the teid_table_add_teid field contains the TEID and the teid_table_add_entry contains the table entry to be added. The GTP OpenFlow extension message for deleting a TEID entry from the encapsulation virtual port hash table is:

```
struct ermst_teid_table_del {
    ermst_gtp_message_code teid_table_del_type;
    uint16_t teid_table_del_teid;
};
```

The teid_table_del_type field is set to GTP_DEL_TEID_TABLE_ENTRY while the teid_table_del_teid field contains the TEID for the entry to be deleted.

In one embodiment, the extensions to OpenFlow for GTP also encompass OpenFlow switch configuration. Prior to accepting any GTP routing update RPCs from 3G PC cloud control plane entities, the OpenFlow controller must configure GTP encapsulation and/or decapsulation virtual ports on the GTP extended OpenFlow gateway switches. The configuration is accomplished using a switch-specific configuration protocol, and is described above.

In addition to virtual port configuration on the GTP extended OpenFlow gateways, QoS queue configuration may be required on any OpenFlow switch that will be forwarding better than best effort GTP bearer traffic. The OpenFlow protocol contains no messages for configuring queues, this configuration is left up to the configuration protocol, as is the case with virtual ports. Prior to installing any flow routes, the OpenFlow controller must configure any queues to connect with physical and/or virtual ports in switches that will route better than best effort GTP bearers. This configuration step must be done both for GTP extended OpenFlow switches and standard OpenFlow switches.

In one embodiment OpenFlow message flows for GTP operations are modified. As described above, the 3G PC control plane entities, including the 3G PC control plane parts of the SGSN and the SSSN reside in a cloud computing facility at a data center. The control plane of the SGSN and GGSN communicate via remote procedure calls (RPCs) or similar mechanism with the OpenFlow controller within the cloud when routing changes are triggered by the GTP signaling. The OpenFlow controller enacts the changes on the data plane to GTP extended OpenFlow enabled data plane gateways, the control plane of the SGSN and GGSN, and to OpenFlow switches that are extended for GTP routing, referred to herein as 'GxOFS,' through OpenFlow signaling on the control plane network connecting the cloud to the gateways and switches.

In general, no signaling is required to the GxOFS if no special routing treatment is required for GTP flows. Cases where such treatment might be required are, for example: where a where the operator's 3G PC has peering points with the Internet at more than one point and consequently has more than one gateway, routing to the optimal gateway may require steering traffic within the 3G PC at intermediate switches; and where the GTP flow must receive special treatment from an application somewhere within the operator's network, for example, within the cloud. An example of such special treatment is transcoding. The intermediate switches may require programming to route the user plane packets to the transcoding application. This list is not exhaustive, many other applications of GTP routing on intermediate switches are possible.

GTP PDP context tunnels can be set up using the GTP-C create PDP context request messages. This procedure is used in a variety of message sequences, for example, in an E-UTRAN initial attach procedure.

Figures 18A, 18B:
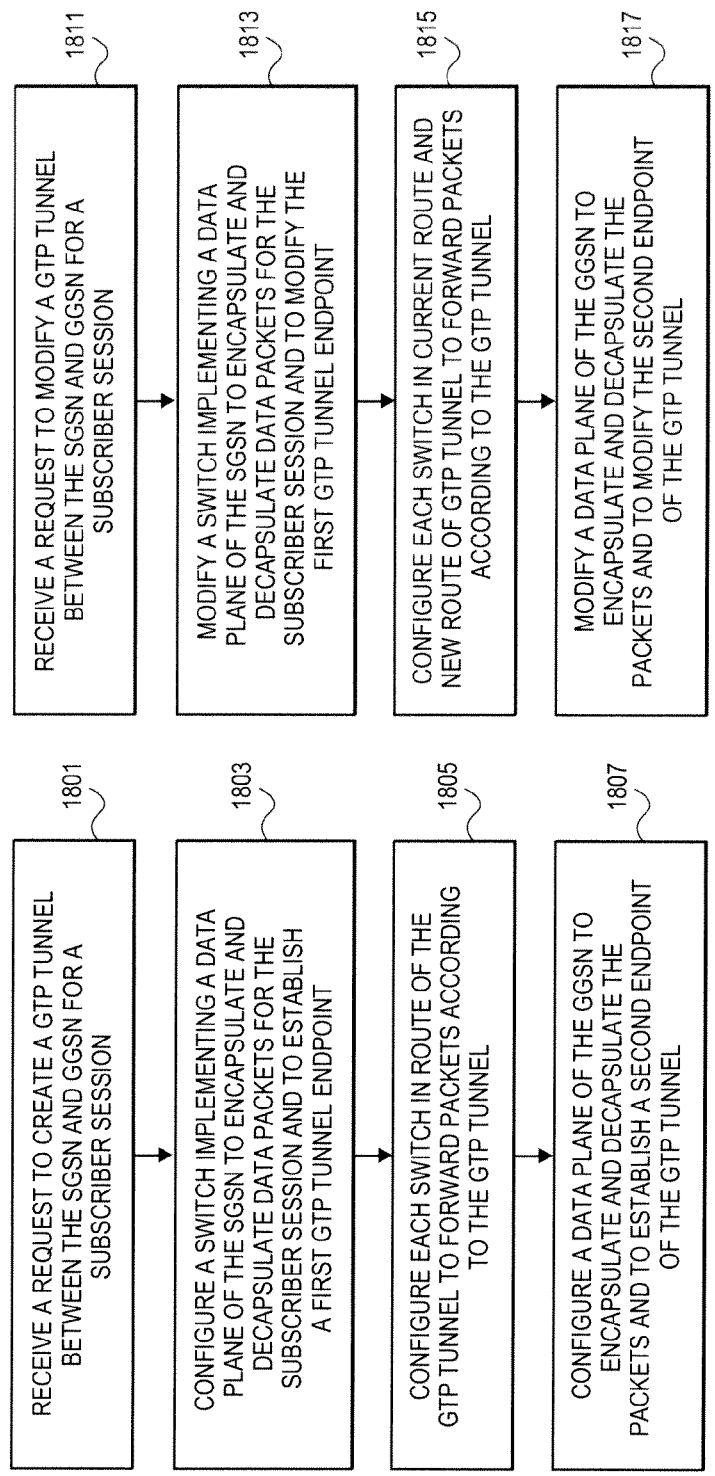
FIGS. 18A-C are flowcharts of session creation, modification and deletion in the 3G PC.
Figure 18C:
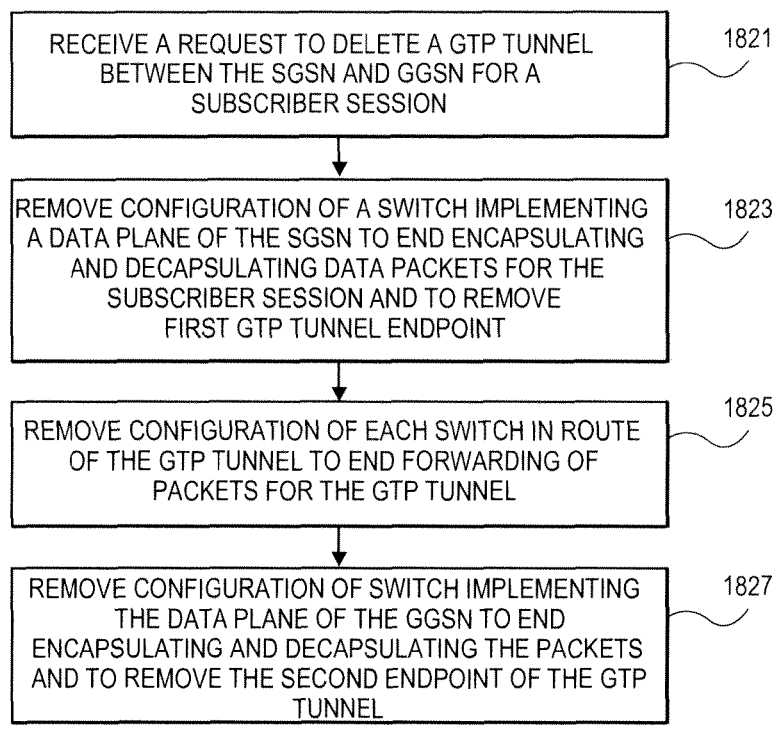

FIGS. 18A-C are flowcharts of session creation, modification and deletion in the 3G PC. The process for creating a session is illustrated in FIG. 18A. The process is initiated in response to a request to create a GTP tunnel between a SGSN and a GGSN for a subscriber session (Block 1801). The subscriber session is initiated to connect user equipment in the 3G PC to another endpoint of the subscriber session, which can be another user equipment, a server or similar endpoint. The GTP tunnel establishes the route of the subscriber session across the core network of the 3G PC network to a peering point, the Internet or similar endpoint. The controller configures a switch implementing the SGSN to encapsulate and decapsulate data packets for the subscriber session and to establish a first GTP tunnel endpoint (Block 1803). The controller also configures each switch in the route of the GTP tunnel to forward packets in each direction according to the route of the GTP tunnel (Block 1805). The controller configures a data plane of the GGSN to encapsulate and decapsulate the packets of the subscriber session to establish a second endpoint of the GTP tunnel at the GGSN (Block 1807).

The process for modifying a session is illustrated in FIG. 18B. The process is initiated in response to a request to modify a GTP tunnel between a SGSN and a GGSN for a subscriber session (Block 1811). The subscriber session connects user equipment in the 3G PC to another endpoint of the subscriber session, which can be another user equipment, a server or similar endpoint. The GTP tunnel is an established route of the subscriber session across the core network of the 3G PC network to a peering point, the Internet or similar endpoint. A modification process can be utilize to re-route a subscriber session across the 3G PC network to the same endpoints or to different endpoints. Any combination of the endpoints of the GTP tunnel and the path of the GTP can be changed using this process. The controller modifies the configuration of the switch implementing the SGSN to encapsulate and decapsulate data packets for the subscriber session and to modify a first GTP tunnel endpoint (Block 1813). The controller also configures each switch in the current route and the new route of the GTP tunnel to forward packets in each direction according to the route of the GTP tunnel (Block 1815). The controller modifies the configuration of a data plane of the GGSN to encapsulate and decapsulate the packets of the subscriber session to establish a second endpoint of the GTP tunnel at the GGSN (Block 1817).

The process for deleting a session is illustrated in FIG. 18C. The process is initiated in response to a request to delete a GTP tunnel between a SGSN and a GGSN for a subscriber session (Block 1821). The subscriber session connects user equipment in the 3G PC to another endpoint of the subscriber session, which can be another user equipment, a server or similar endpoint. The GTP tunnel is an established route of the subscriber session across the core network of the 3G PC network to a peering point, the Internet or similar endpoint. The subscriber session and associated GTP tunnel are deleted when the associated application on the user equipment or the application on the other user equipment or the server application on the other end of the subscriber session terminate the connection. The subscriber session resources are then reclaimed by deleting the subscriber session and the GTP tunnel. The controller removes the configuration of the GTP tunnel at a switch implementing the SGSN that had been encapsulating and decapsulating data packets for the subscriber session and thereby removes a first GTP tunnel endpoint (Block 1823). The controller also removes configuration for the GTP tunnel from each switch in the route of the GTP tunnel that had been forwarding packets in each direction according to the route of the GTP tunnel (Block 1815). The controller removes configuration for the GTP tunnel from a data plane of the GGSN that had been encapsulating and decapsulating the packets of the subscriber session and thereby removes a second endpoint of the GTP tunnel at the GGSN (Block 1827).

Figure 19:
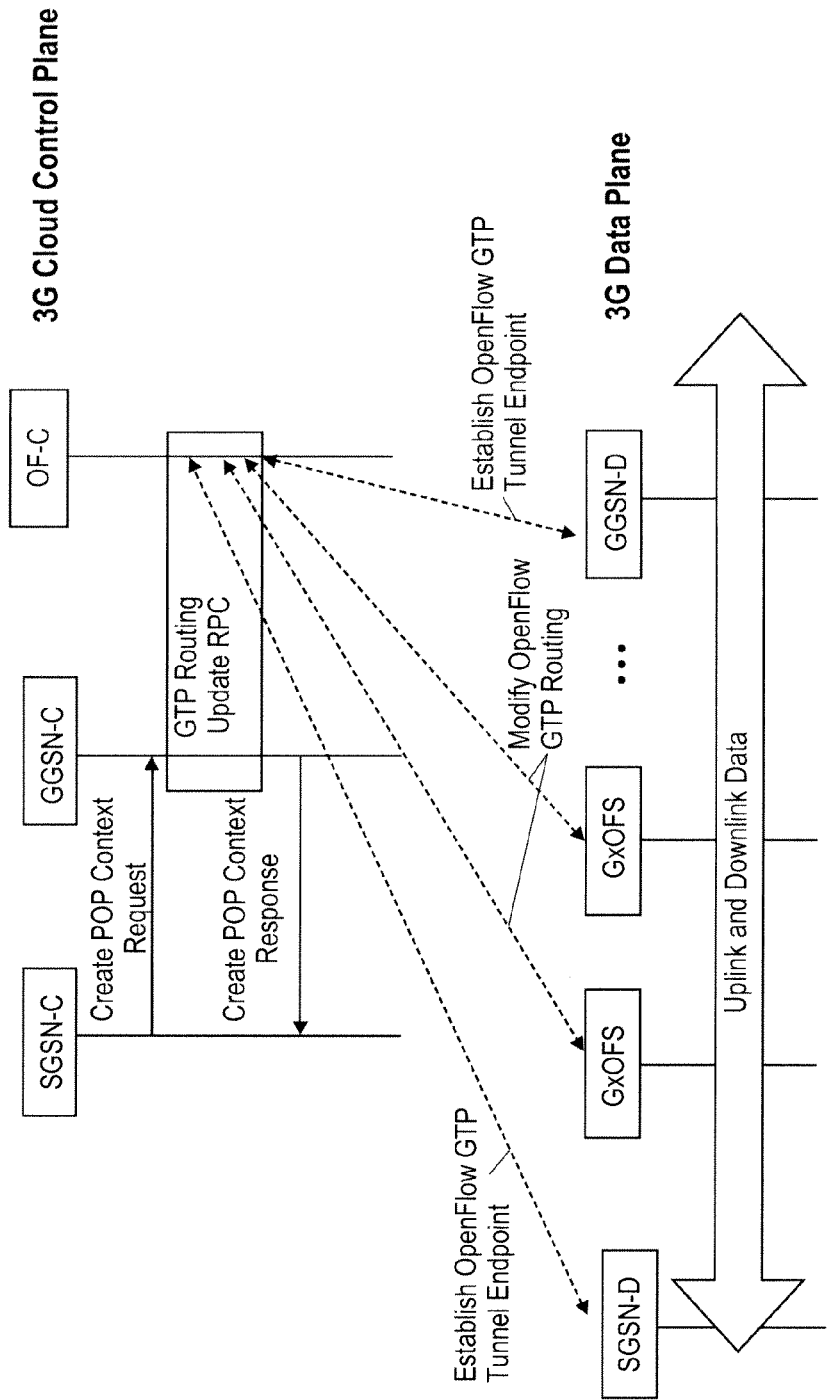
FIG. 19 is a diagram of one embodiment of an OpenFlow message flow for the create session request procedure.

In FIG. 19, an example of the OpenFlow message flows for the create session request procedure are shown. In the illustrated example, the SSGN control plane component sends a create session request to the GGSN control plane component in the cloud computing system, which then sends the request to the controller through a GTP routing update RPC call. The RPC call requests that the OpenFlow controller establish a new GTP tunnel endpoint at the SGSN and GGSN in the data plane, and to install routes for the new GTP bearer or tunnel on intermediate switches, if necessary.

Before returning a result to the control plane GGSN from the GTP routing update RPC, the OpenFlow controller issues a sequence of OpenFlow messages to the appropriate data plane gateway entity. In the example embodiment, the sequence begins with an OFP_BARRIER_REQUEST to ensure that there are no pending messages that might influence processing of the following messages. Then an OFPT_FLOW_MOD message is issued, including the ofp_match structure with GTP extension as the match field and OFPFC_ADD as the command field. The message specifies actions and instructions, as described above, to establish a flow route for the GTP tunnel that encapsulates and decapsulates the packets through the appropriate virtual port. In addition, immediately following the OFPT_FLOW_MOD message, the OpenFlow controller issues a GTP_ADD_TEID_TABLE_ENTRY message to the gateways containing the TEID hash table entries for the encapsulation virtual port. As described above, the two OpenFlow messages are followed by an OFPT_BARRIER_REQUEST message to force the gateways to process the flow route and TEID hash table update before proceeding.

Prior to returning from the GTP routing update RPC, the OpenFlow controller also issues GTP flow routing updates to any GTP extended OpenFlow Switches (GxOFSs) that need to be involved in customized GTP flow routing. The messages in these updates consist of an OFP_BARRIER_REQUEST followed by an OFPT_FLOW_MOD message containing the ofp_match structure with GTP extension for the new GTP flow as the match field and OFPFC_ADD as the command field, and the actions and instructions described above for customized GTP flow routing. A final OFP_BARRIER_REQUEST forces the switch to process the change before responding. The flow routes on any GxOFSs are installed after installing the GTP tunnel endpoint route on the SGSN in the data plane and prior to installing the GTP tunnel endpoint route on the GGSN in the data plane, as illustrated in FIG. 19. The OpenFlow controller does not respond to the control plane GGSN RPC until all flow routing updates have been accomplished.

Once the RPCs have returned, the control plane GGSN and SGSN return create PDP context response messages. Characteristics of the GTP bearer are changed using an update PDP context request process. Such changes may, for example, include the QoS assigned to the IP packets. This procedure is used in a variety of 3G PC message sequences, for example, a UE triggered service request.

Figure 20:
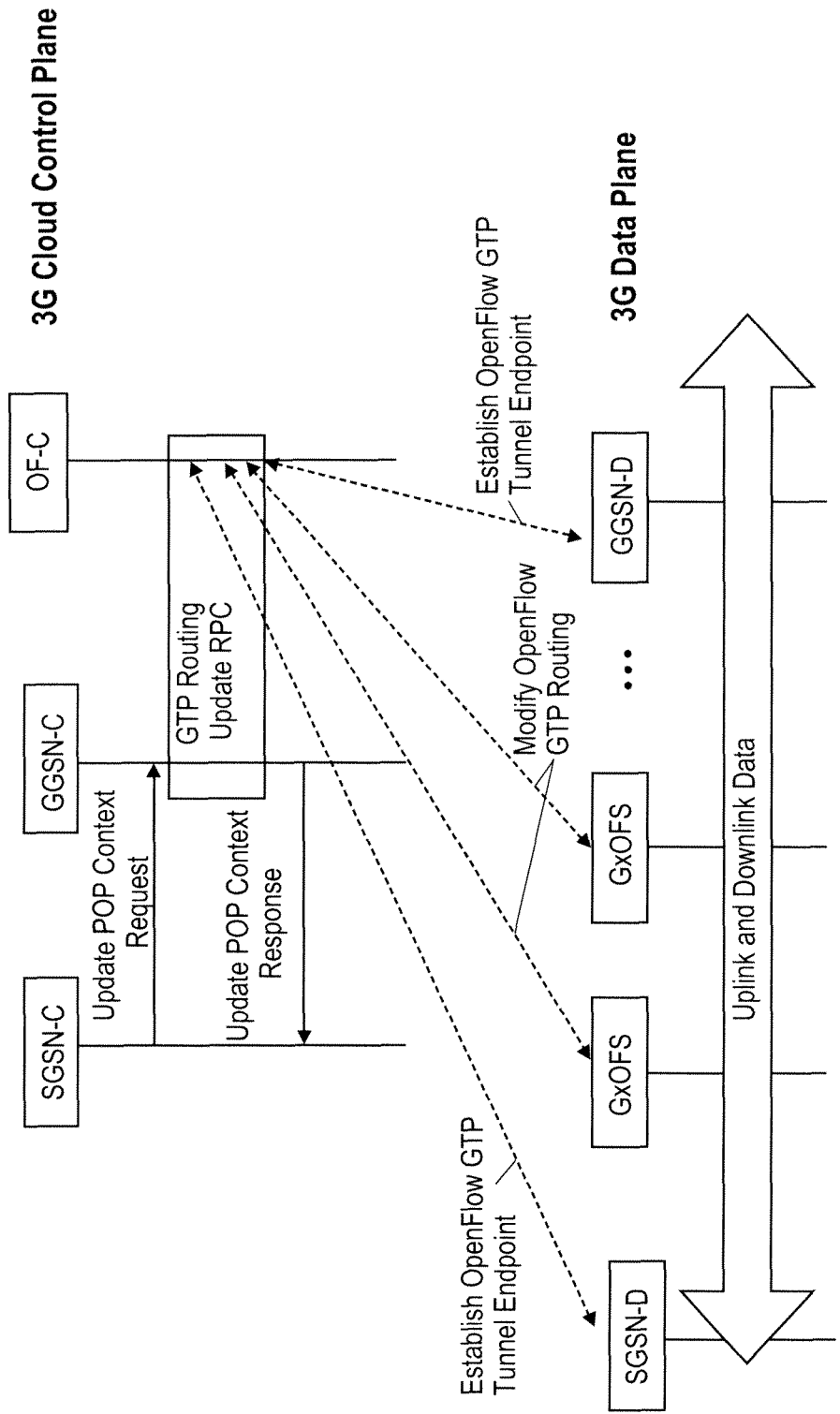
FIG. 20 is a diagram of one embodiment of the OpenFlow message sequence for the modify session request procedure.

FIG. 20 is a diagram of one embodiment of the OpenFlow message sequence for the modify session request procedure. As with session creation, the 3G PC cloud control plane SGSN issues an update PDP context request message to the control plane GGSN and the control plane GGSN issues a GTP routing update RPC to the OpenFLow controller including the new tunnel update information. The OpenFlow controller then issues GTP extended OpenFlow messages to the data plane SGSN, GxOFSes, and the data plane GGSN.

Before returning a result to the control plane GGSN from the GTP routing update RPC, the OpenFlow controller issues a sequence of OpenFlow messages to the appropriate data plane gateway entity. The sequence begins with an OFP_BARRIER_REQUEST to ensure that there are no pending messages that might influence processing of the following messages. Then an OFPT_FLOW_MOD message is issued, including the ofp_match structure with GTP extension as the match field and OFPFC_MODIFY or OFPFC_MODIFY_STRICT as the command field. If necessary, the message specifies actions and instructions, as described above, to establish a new flow route for the GTP tunnel that encapsulates and decapsulates the packets through the appropriate virtual port. In addition, if changes are required in the TEID hash table, immediately following the OFPT_FLOW_MOD message, the OpenFlow controller issues a TP_DEL_TEID_TABLE_ENTRY to delete the entry followed by a TP_ADD_TEID_TABLE_ENTRY message to install the new entry. As described above, the two OpenFlow messages are followed by an OFPT_BARRIER_REQUEST message to force the gateways to process the flow route and TEID hash table update before proceeding.

Prior to returning from the GTP routing update RPC, the OpenFlow controller also issues necessary GTP flow routing updates to any GTP extended OpenFlow Switches (GxOFSs) that need to be involved in customized GTP flow routing. The messages in these updates consist of an OFP_BARRIER_REQUEST followed by an OFPT_FLOW_MOD message containing the ofp_match structure with GTP extension for the new GTP flow as the match field and OFPFC_MODIFY or OFPFC_MODIFY_STRICT as the command field, and, if necessary, the actions and instructions, as described above, for customized GTP flow routing. A final OFP_BARRIER_REQUEST forces the switch to process the change before responding. The flow routes on any GxOFSs are installed after installing the GTP tunnel endpoint route on the data plane SGSN and prior to installing the GTP tunnel endpoint route on the data plane GGSN, as illustrated in FIG. 20. The OpenFlow controller does not respond to the control plane GGSN RPC until all flow outing updates have been accomplished. Once the RPCs have returned, the control plane GGSN and SGSN return update PDP context messages.

Figure 21:
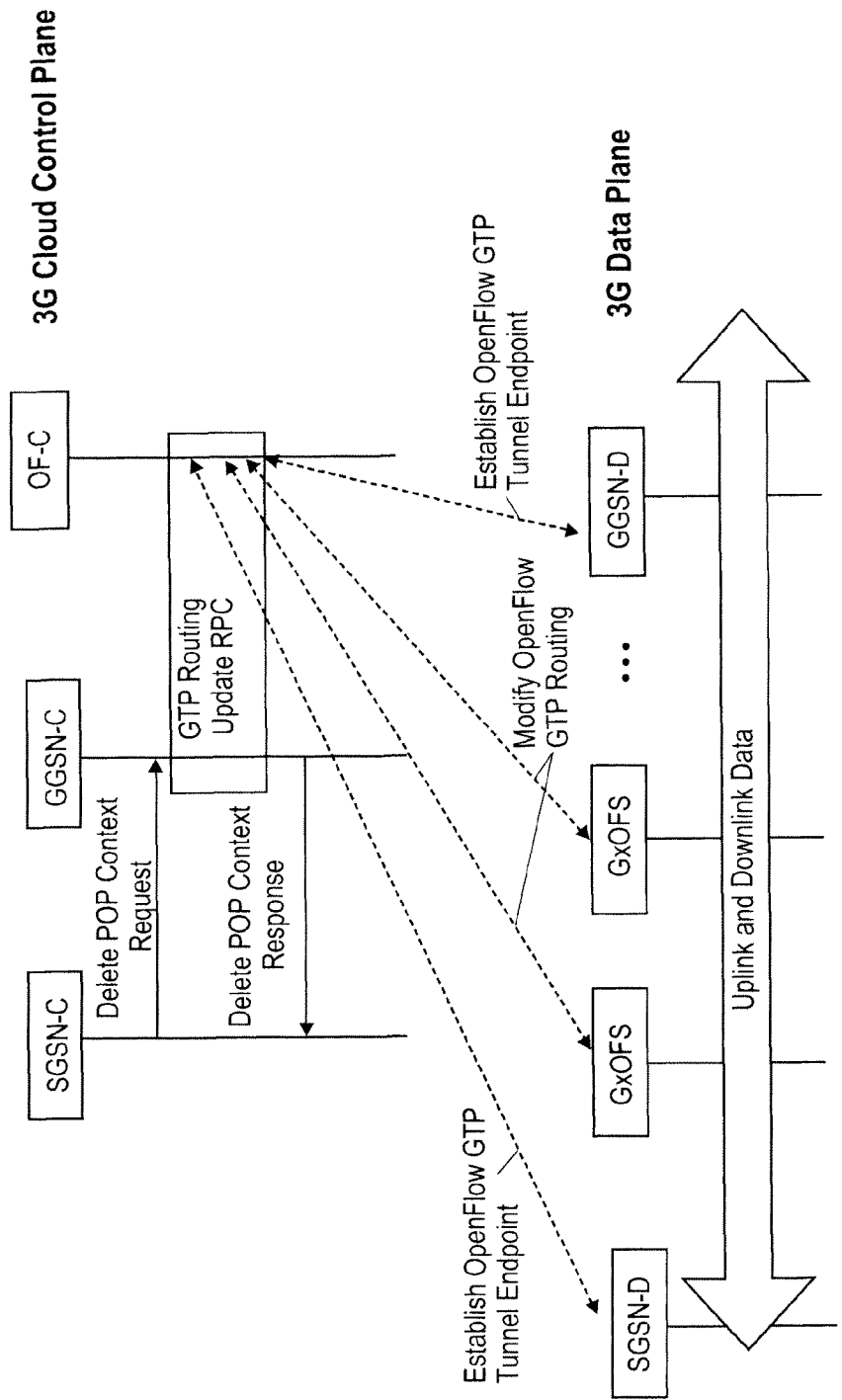
FIG. 21 is a diagram of one embodiment of the OpenFlow message sequence for the delete session request procedure

GTP tunnels are deleted using the delete session request procedure. This procedure can be used in a variety of 3G PC message sequences, for example, a UE triggered detach request. FIG. 21 is a diagram of one embodiment of the OpenFlow message sequence for the delete session request procedure. Similar to session creation and modification, the 3G PC cloud control plane SGSN issues a delete PDP context request message to the control plane GGSN and the control plane GGSN issues a GTP routing update RPC to the OpenFLow controller including the tunnel deletion information. The OpenFlow controller then issues GTP extended OpenFlow messages to the data plane SGSN, GxOFSes, and the data plane GGSN.

The OpenFlow signaling is conducted prior to returning the GTP routing update RPC to the calling party. The sequence begins with an OFP_BARRIER_REQUEST to ensure that there are no pending messages that might influence processing of the following messages. Then an OFPT_FLOW_MOD message is issued, including the ofp_match structure with GTP extension as the match field and OFPFC_DELETE or OFPFC_DELETE_STRICT as the command field. In addition, immediately following the OFPT_FLOW_MOD message, the OpenFlow controller issues a GTP_DEL_TEID_TABLE_ENTRY to delete the TEID hash table entry. As described above, this OpenFlow message is followed by an OFPT_BARRIER_REQUEST message to force the gateways to process the flow route and TEID hash table update before proceeding.

Prior to returning from the GTP routing update RPC, the OpenFlow controller also issues necessary GTP flow routing updates to any GTP extended OpenFlow Switches that need to be involved in customized GTP flow routing. The messages in these updates consist of an OFP_BARRIER_REQUEST followed by an OFPT_FLOW_MOD message containing the ofp_match structure with GTP extension for the new GTP flow as the match field and OFPFC_DELETE or OFPFC_DELETE_STRICT as the command field. A final OFP_BARRIER_REQUEST forces the switch to process the change before responding. The flow routes on any GxOFSs are installed after installing the GTP tunnel endpoint route on the data plane SGSN and prior to installing the GTP tunnel endpoint route on the data plane GGSN, as illustrated in FIG. 21. The OpenFlow controller does not respond to the calling entity until all flow routing updates have been accomplished.

Alternate Implementations

In other embodiments, the split 3G PC architecture can be implemented in non-cloud and non-virtualized systems. The control plane entities of the 3G PC architecture can be stored and executed on a single server or distributed across any number of servers or similar computing devices. Similarly, the control plane entities can be executed as standard software code and modules without virtualization or similar systems. These control plane entities can communicate with one another through local system or procedure calls, remote procedure calls or similar mechanisms. In further embodiments, a subset of the control plane entities can be virtualized or executed in a cloud computing system while another subset of the control plane entities can be executed in a server, distributed server system or similar system. The control plane entities can communicate with the data plane through the use of the OpenFlow protocol as described herein above or through other control protocols as described herein below.

The cloud computing system described herein above is provided by way of example and not by way of limitation. One skilled in the art would understand that the principles and features described above in relation to the cloud computing system can also be implemented in other configurations such as single servers or distributed server systems. Similar principles and features to those described above can be implemented in single server systems, distributed server systems and similar computing environments. These principles and features can also be implemented using a non-virtualized environment including non-virtualized control plane entities that are executed in any combination of cloud computing systems, single servers, distributed server systems and similar systems.

In other embodiments, other control protocols can be utilized in place of OpenFlow as described herein. The use of OpenFlow is presented by way of example and not limitation. Other control protocols can also be utilized to manage the communication between the control plane and data plane and configuration of the data plane of the split 3G PC architecture. An example of such a protocol is FORCES, an IETF standard protocol for splitting the control plane and forwarding plane in networks. The FORCES protocol specification is described in RFC 5810. RFC 5812 describes the architecture of a FORCES forwarding element, the equivalent of an OpenFlow switch. The FORCES protocol itself does not directly support programming routes into the forwarding element, it is, instead, a framework for handling the interaction between the FORCES controller and a FORCES forwarding element. The forwarding element architecture describes how to design the protocol that actually allows a FORCES controller to program a FORCES forwarding element. One skilled in the art would understand that a FORCES based system could include features described herein above in relation to the OpenFlow embodiment, such as the GTP OpenFlow extension, to allow the controller to program the switches for GTP TEID routing.

FORCES and OpenFlow are provided by way of example and not limitation. One skilled in the art would understand that the principles and features described above in relation to the FORCES and OpenFlow protocols can also be implemented in other similar control protocols.

Thus, a method, system and apparatus for implementing a 3G PC in a cloud computing system has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for implementing a general packet radio service (GPRS) tunnel protocol (GTP) in a packet core (PC) of a third generation (3G) network having a split architecture where a control plane of the PC of the 3G network is in a cloud computing system, the cloud computing system including a controller, the control plane to communicate with the data plane of the PC through a control plane protocol, the data plane implemented in a plurality of network elements of the 3G network separate from the cloud computing system, the method comprising the steps of:

receiving a request by the controller to create a GTP tunnel in the PC of the 3G network between a serving GPRS support node (SGSN) and a gateway GPRS support node (GGSN) for a subscriber session, the controller to execute a plurality of control plane modules that manage the data plane of the plurality of network elements via the control plane protocol;

configuring a switch implementing a data plane of the SGSN, via the control protocol, to encapsulate and decapsulate packets of the subscriber session and to establish a first GTP tunnel endpoint;

configuring at least one switch in a route of the GTP tunnel, via the control plane protocol, to forward packets of the subscriber session according to the GTP tunnel; and configuring a switch implementing a data plane of the GGSN, via the control plane protocol, to encapsulate and decapsulate the packets of the subscriber session and to establish a second GTP tunnel endpoint.

2. The method of claim 1 wherein receiving the request by the controller to create a GTP tunnel further comprises the step of receiving a protocol data packet (PDP) context creation request from a control plane component of the SGSN.

3. The method of claim 1, wherein receiving the request by the controller to create a GTP tunnel further comprises the step of receiving a GTP routing update request from a control plane component of the GGSN.

4. The method of claim 1, further comprising the steps of:
receiving a request by the controller to modify the GTP tunnel in the PC of the 3G network between the SGSN and GGSN for the subscriber session;

modifying a configuration of the switch implementing the data plane of the SGSN, via the control plane protocol, to encapsulate and decapsulate packets of the subscriber session and to modify the first GTP tunnel endpoint; and modifying a configuration of the switch implementing the data plane of the GGSN, via the control plane protocol, to encapsulate and decapsulate the packets of the subscriber session and to modify the second GTP tunnel endpoint.

5. The method of claim 4, further comprising the step of removing configuration at the least one switch in the route of the GTP tunnel, via the control plane protocol, to end forwarding of packets of the subscriber session according to the GTP tunnel.

6. The method of claim 5, further comprising the step of configuring a switch in a new route of the GTP tunnel, via the control plane protocol, to forward packets of the subscriber session according to the GTP tunnel.

7. The method of claim 1, further comprising the steps of:
receiving a request by the controller to delete the GTP tunnel in the PC of the 3G network between the SGSN and GGSN for the subscriber session;
removing a configuration of the switch implementing the data plane of the SGSN, via the control plane protocol, to end encapsulation and decapsulation of packets of the subscriber session and to remove the first GTP tunnel endpoint; and
removing a configuration of the switch implementing the data plane of the GGSN, via the control plane protocol, to end encapsulation and decapsulation of the packets of the subscriber session and to remove the second GTP tunnel endpoint.

8. A cloud computing system for managing implementation of a general packet radio service (GPRS) tunnel protocol (GTP) in a packet core (PC) of a third generation (3G) network having a split architecture where a control plane of the PC of the 3G network is in the cloud computing system, the control plane to communicate with a data plane of the PC through a control plane protocol, the data plane implemented in a plurality of network elements of the 3G network separate from the cloud computing system, the cloud computing system comprising:
a plurality of servers in communication with one another and in communication with the plurality of network elements implementing the data plane of the PC, the plurality of servers executing,
a controller configured to execute a plurality of control plane modules implementing the control plane of the PC, each control plane module to provide a set of control plane functions for managing the data plane, the controller configured to receive a request to create a GTP tunnel in the PC of the 3G network between a serving GPRS support node (SGSN) and a gateway GPRS support node (GGSN) for a subscriber session, the controller configured to configure a switch implementing a data plane of the SGSN, via the control plane protocol, to encapsulate and decapsulate packets of the subscriber session and to establish a first GTP tunnel endpoint, the controller configured to configure at least one switch in a route of the GTP tunnel, via the control plane protocol, to forward packets of the subscriber session according to the GTP tunnel, and the controller configured to configure a switch implementing a data plane of the GGSN, via the control plane protocol, to encapsulate and decapsulate the packets of the subscriber session and to establish a second GTP tunnel endpoint; and
a cloud manager communicatively coupled to the controller, the cloud manager configured to manage execution of the plurality of control plane modules of the PC.

9. The cloud computing system of claim 8, wherein the controller receives the request to create a GTP tunnel as a protocol data packet (PDP) context creation request from a control plane component of the SGSN.

10. The cloud computing system of claim 8, wherein the controller receives the request to create a GTP tunnel as a GTP routing update request from a control plane component of the GGSN.

11. The cloud computing system of claim 8, wherein the controller is configured to receive a request to modify the GTP tunnel in the PC of the 3G network between the SGSN and GGSN for the subscriber session, the controller is configured to modify configuration of the switch implementing the data plane of the SGSN, via the control plane protocol, to encapsulate and decapsulate packets of the subscriber session and to modify the first GTP tunnel endpoint, and the controller is configured to modify configuration of the switch implementing the data plane of the GGSN, via the control plane protocol, to encapsulate and decapsulate the packets of the subscriber session and to modify the second GTP tunnel endpoint.

12. The cloud computing system of claim 11, wherein the controller is configured to remove configuration of the at least one switch in the route of the GTP tunnel, via the control plane protocol, to end forwarding of packets of the subscriber session according to the GTP tunnel.

13. The cloud computing system of claim 12, wherein the controller is configured to configure a switch in a new route of the GTP tunnel, via the control plane protocol, to forward packets of the subscriber session according to the GTP tunnel.

14. The cloud computing system of claim 8, wherein the controller is adapted to receive a request by the controller to delete the GTP tunnel in the PC of the 3G network between the SGSN and GGSN for the subscriber session, the controller is configured to remove configuration of the switch implementing the data plane of the SGSN, via the control plane protocol, to end encapsulation and decapsulation of packets of the subscriber session and to remove the first GTP tunnel endpoint, and the controller is configured to remove configuration of the switch implementing the data plane of the GGSN, via the control plane protocol, to end encapsulation and decapsulation of the packets of the subscriber session and to remove the second GTP tunnel endpoint.

* * * * *

UNITED STATES PATENT AND TRADEMARK OFFICE
CERTIFICATE OF CORRECTION

PATENT NO. : 8,762,501 B2  
APPLICATION NO. : 13/220471  
DATED : June 24, 2014  
INVENTOR(S) : Kempf et al.

It is certified that error appears in the above-identified patent and that said Letters Patent is hereby corrected as shown below:

In the Drawings

In Fig. 9, Sheet 8 of 20, below Table, Line 1, delete "shl" and insert -- shall --, therefor.

In Fig. 15, Sheet 13 of 20, for Tag "1615", delete "1615" and insert -- 1515 --, therefor.

In the Specification

In Column 6, Line 6, delete "sort" and insert -- short --, therefor.

In Column 8, Line 56, delete "(CN) 801" and insert -- (CN) 801, --, therefor.

In Column 12, Line 57, delete "13401)." and insert -- 1301). --, therefor.

In Column 12, Line 67, delete "1205)," and insert -- 1305), --, therefor.

In Column 13, Line 4, delete "1207)." and insert -- 1307). --, therefor.

In Column 13, Line 10, delete "1209)." and insert -- 1309). --, therefor.

In Column 13, Line 12, delete "1211)." and insert -- 1311). --, therefor.

In Column 16, Line 28, delete "Enacup-VP" and insert -- Encap-VP --, therefor.

In Column 24, Line 40, delete "flow outing" and insert -- flow routing --, therefor.

Signed and Sealed this  
Eleventh Day of November, 2014

Michelle K. Lee  
*Deputy Director of the United States Patent and Trademark Office*

CERTIFICATE OF CORRECTION (continued)
U.S. Pat. No. 8,762,501 B2

In the Claims

In Column 26, Line 52, in Claim 2, delete "claim1" and insert -- claim1, --, therefor.

In Column 27, Line 7, in Claim 5, delete "at the least" and insert -- the at least --, therefor.